United States Patent
Ueda et al.

[11] Patent Number: 5,830,972
[45] Date of Patent: Nov. 3, 1998

[54] POLYSILANE, ITS PRODUCTION PROCESS AND STARTING MATERIALS THEREFOR

[75] Inventors: Masato Ueda, Tsukuba; Fumi Yamaguchi, Tsuchiura; Yukio Fujii; Isao Yahagi, both of Tsukuba; Manabu Sasaki, Niihama; Takenori Osada; Makoto Kitano, both of Tsukuba; Yasuaki Abe, Takarazuka, all of Japan

[73] Assignee: Sumitomo Chemical Company, Limited, Osaka, Japan

[21] Appl. No.: 629,602

[22] Filed: Apr. 9, 1996

[30] Foreign Application Priority Data

| | | | |
|---|---|---|---|
| Apr. 10, 1995 | [JP] | Japan | 7-083924 |
| Jun. 28, 1995 | [JP] | Japan | 7-161863 |
| Jun. 28, 1995 | [JP] | Japan | 7-161864 |
| Jul. 25, 1995 | [JP] | Japan | 7-189336 |

[51] Int. Cl.$^6$ .......................... C08G 77/60; C08G 77/26
[52] U.S. Cl. ........................ 528/38; 528/43; 556/430; 556/413; 556/427; 556/445; 430/59; 430/58
[58] Field of Search .................. 556/430, 413; 528/38, 43; 430/59

[56] References Cited

U.S. PATENT DOCUMENTS

| | | | |
|---|---|---|---|
| 4,618,551 | 10/1986 | Stolka et al. | 430/58 |
| 5,213,923 | 5/1993 | Yokoyama et al. | 430/58 |
| 5,262,260 | 11/1993 | Yokoyama et al. | 430/58 |
| 5,407,987 | 4/1995 | Fukushima et al. | 524/367 |
| 5,527,850 | 6/1996 | Katayama et al. | 524/434 |

FOREIGN PATENT DOCUMENTS

| | | |
|---|---|---|
| 03235958 | 10/1991 | European Pat. Off. . |
| 0 654 495 A1 | 5/1995 | European Pat. Off. . |
| 2017485 | 5/1970 | France . |
| 03235958 | 10/1991 | Japan . |
| A-0764311 | 3/1995 | Japan . |
| 1 251 406 | 10/1971 | United Kingdom . |
| 2156834 | 10/1985 | United Kingdom . |

OTHER PUBLICATIONS

Xerox Disclosure Journal 2381, 19 Sep./Oct., No. 5., 1994.
Pai, D.M., Badesha, S.S., "Novel Charge Transporting Systems", Xerox Disclosure Journal, vol. 19, No. 5, Sep. 1994, pp. 363–365.

Sobolev, E.S., "OrganodichloroSynthesis of organosilicon monomers containing radicals with ether bonds", Chemical Abstracts, vol. 72, No. 22, Jun. 1970, pp. 2691–2694.
Abstract of Dokl. Akad. Nauk SSR, 216(5), 1062–5, (1974) V.A. Kuznetsov et al., "Effects of Conjugation in an Excited Electron State of Thiophene Derivatives".
Abstract of Zh. Obschch. Khim., 39(12), 2691–4, (1969) E.S. Sobolev et al., "Synthesis of Organosilicon Monomers Containing Radicals With Ether Bonds".
Abstracts of JP 05043702 A (Shin Etsu Chem. Co., Ltd.) Dihalosilane Having a Carbazoyl Use as a Monomer in Polysilane Preparation.

*Primary Examiner*—Margaret W. Glass
*Attorney, Agent, or Firm*—Pillsbury Madison & Sutro LLP

[57] ABSTRACT

A polysilane is disclosed whose main chain skeleton has a repeating unit represented by the general formula (1):

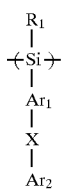

wherein $R_1$ represents a substituted or unsubstituted alkyl cycloalkyl, aryl or aralkyl group; X is a atom having an unpaired electron or a group containing an atom having an unpaired electron and represents an oxygen atom, sulfer atom or a nitrogen atom-containing group represented by the general formula (2):

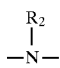

wherein $R_2$ represents a substituted or unsubstituted alkyl, cycloalkyl, aryl or aralkyl group; $Ar_1$ represents a substituted or unsubstituted arylene group; and $Ar_2$ represents a substituted or unsubstituted aryl group, a group having an aromatic amine skeleton or a group ethenylene skeleton; a process for producing the polysilane; and a dihalosilane which is the starting material therefor. The polysilane compound has an excellent moldability as a high polymeric material and a higher hole drift mobility as a hole transporting material.

12 Claims, No Drawings

POLYSILANE, ITS PRODUCTION PROCESS AND STARTING MATERIALS THEREFOR

BACKGROUND OF THE INVENTION

This invention relates to a polysilane which is useful as a photoconductive material, a nonlinear optical material, a precursor of nonoxide ceramic having excellent heat resistance, or the like, more particularly to a polysilane compound having an enhanced hole drift mobility; a process for producing the same; and the starting materials therefor.

As a hole transporting material and/or an electron transporting material used in an electrophotographic photoreceptor and the like, such inorganic compounds as amorphous selenium and the like have heretofore been mainly used from the viewpoint of the magnitude of hole drift mobility and/or electron drift mobility and durability. However, inorganic compounds contain harmful materials in many cases, and hence, scrapping the same and countermeasures for environmental pollution have become a problem. When amorphous selenium having a high hole drift mobility is used, it is necessary to use a vacuum evaporation method or the like for the formation of a thin film and hence the productivity is inferior, which causes an increase of production cost.

As an inorganic compound which is a hole transporting material and/or an electron transporting material free from the environmental pollution, attention has recently been paid to an amorphous silicon. Though the amorphous silicon is excellent in the hole drift mobility or the electron drift mobility, it has a problem in productivity because a plasma CVD method is required for the formation of a thin film.

On the other hand, organic materials, almost all of which transport holes only, have such advantages that they are free from environmental pollution, can be formed into a thin film by coating and are easy for a mass-production. Therefore, organic materials are superior to the reduction of the production cost and the moldability into various shapes depending upon uses. However, conventional organic hole transporting materials have such a problem that their hole drift mobilities are low, and hence, the development of organic hole transporting materials having a higher hole drift mobility has been strongly desired and various studies for enhancing the hole drift mobilities of organic hole transporting materials have been made.

The hole conduction mechanism of organic hole transporting materials is known to be a hole hopping conduction. In order to enhance the hole drift mobility thereof, it is essentially important to increase the probability of the hopping of holes from a site to another. Specifically, it is necessary that the number of hopping sites is increased for shortening the distance between the sites, and also, that the energy levels between hopping sites are made consistent with one another to prevent the formation of such a hole trapping level which prevents the holes hopping to the next site.

As the organic hole transporting material, known are an organic photoconductive polymeric material having a carbon-backbond and materials in which a low-molecular hole transporting agent is dispersed in a resin. For example, polyvinyl carbazole is known as photoconductive polymeric material, and an arylamine derivative or a hydrazone derivative is known as low-molecular hole transporting agent which is dispersed in a resin such as polycarbonate or the like.

In the case of polyvinyl carbazole as the photoconductive material, holes move by hopping on the side chains of carbazole rings. However, when the carbazole rings are arranged in the side chain, some adjacent carbazole rings unusually close to each other to form the hole trapping sites, so that the hole drift mobility becomes as extremely low as about $10^{-7}$ cm$^2$/V/sec at room temperature (about 25° C.).

As a substitute for the organic photoconductive polymeric materials, there has become used a low-molecular hole transporting agent as hopping sites which is dispersed uniformly in a resin.

As to the enhancement of the hole drift mobility of the low-molecular hole transporting agent, for example, Yokoyama et al. have examined the hole drift mobility of the system of a series of arylamine derivatives dispersed in a resin and proposed as a molecule design guideline for enhancing the hold drift mobility that an aminophenyl group (N-phenyl group) is used as the minimum unit of the hole hopping site. They also proposed that they incorporated in the molecules are as many as possible and that the $\pi$ electrons of the molecule are delocalized as much as possible (see Takahashi et al., Electrophotography, Vol. 25 (1986) p. 236).

Also, on a mixture of a biphenyldiamine derivatives and a polycarbonate, it is disclosed that when the concentration of the biphenyldiamine derivatives is about 50% by weight, the hole drift mobility at room temperature is about $10^{-5}$ cm$^2$/V/sec, but when the concentration of the biphenyldiamine derivatives is about 80% by weight the hole drift mobility is increased to about $10^{-4}$ cm$^2$/V/sec, and when a biphenylamine compound is used alone the hole drift mobility is increased to about $10^{-3}$ cm$^2$/V/sec [see M. Stolka et al., J. Phys. Chem., Vol. 88 (1984) p. 4707].

However, as a disadvantage of the material with which a low-molecular hole transporting agent is dispersed in a resin, it is pointed out that when the concentration of the low-molecular hole transporting agent increases, the moldability becomes remarkably low due to the crystallization of the hole transporting agent.

On the other hand, as a material to be substituted for the above-mentioned conventional organic hole transporting material whose main skeleton is carbon, attention has become paid to a polysilane whose main skeleton is silicon. The polysilane is not only soluble in organic solvents and excellent in film-formability, but has also such characteristics as a semiconductor. The holes are conducted by the transfer of electrons delocalized through the silicon-silicon linkage of the main chain, so that polysilanes have become expected as an organic semiconductor material (see R. G. Kepler et al. Phys. Rev. B., Vol. 35 (1987) p. 2818).

In particular, it is well known that a poly (methylphenylsilane) has the highest hole drift mobility as a polymeric sole material and it reaches about $10^{-4}$ cm$^2$/V/sec at room temperature. Paying attention to this higher hole drift mobility, it has been proposed that polysilanes are used as a material for the hole transporting layer of an electrophotographic photoreceptor (see U.S. Pat. No. 4,618,551), as a material for the hole transporting layer of an organic electroluminescence device (see JP-A-2-204,996) or as a hole transporting material for the photoconductor layer of an image sensor (see JP-A-2-155,270).

On the other hand, paying attention to the moldability of polysilanes as a polymeric material and the magnitude of the hole drift mobility thereof, it is proposed that a polysilane is substituted as an active binder for the inactive binder resin (for example, polycarbonate or the like) which has been used for dispersing the low molecule hole-transporting agent.

For example, by adding a phenylenediamine derivative as a low-molecule hole transporting agent at a concentration of about 50% by weight to a poly(methylphenylsilane) as an active binder, there is obtained a hole drift mobility of about $10^3$ cm$^2$/V/sec at room temperature which is about one order higher than poly(methylphenylsilane) alone [see K. Yokoyama et al., J. Chem. Soc.; Chem. Commu. (1990), p. 805].

However, in the case of a system in which a low-molecule hole transporting agent is dispersed in polysilanes, it is unavoidable that the moldability of polysilanes are decreased due to the crystallization of the low-molecule hole transporting agent at a high concentration.

Also, it is known that the magnitude of the hole drift mobility of polysilanes is governed by the hopping conduction of the holes from one main chain of polysilane to another.

In the hopping conduction mechanism of polysilanes, it is proposed that a electrons of Si—Si bondings are localized in the segment of 10 to 30 Si atoms which are having a planar zigzag structure forming hopping sites and holes hop from one of the hopping sites to another [refer to M. Abkowitz & M. Stolka, Philos. Mag. Lett., Vol. 58 (1988), p. 239].

Moreover, it has been considered necessary that the polysilanes contain at least 50 Si atoms to form the planar zigzag structure by 10 to 30 Si atoms [see R. D. Miller & J. Michl, Chem. Rev., Vol. 89 (1989), p. 1359]. Therefore, in order to increase the number of hopping sites for enhancing the hole drift mobility, it is essentially important to increase the number of Si atoms in the polysilanes, that is, to increase the degree of polymerization. Polysilanes having a high degree of polymerization are also excellent in film-formability.

In general, as a parameter indicating the degree of polymerization of a polymer, there have often been used a weight averaged molecular weight, a number averaged molecular weight and the ratio of weight averaged molecular weight to number averaged molecular weight. The degree of polymerization of polysilanes, also, is shown by the weight averaged molecular weight and the number averaged molecular weight. For example, JP-A-2-133,416 describes that the number averaged molecular weight of the polymer block of a polysilane is 10 to 50,000 and JP-A-2-294,654 states that the weight averaged molecular weight of a polysilane is 6,000 to 200,000.

JP-A-7-64,311 describes that when the weight averaged molecular weight of a polysilane is 50,000 to 2,500,000 and the ratio thereof to the number averaged molecular weight is 10 or less, the hole drift mobility and the strength of films obtained are improved.

However, the weight averaged molecular weight, the number averaged molecular weight and the ratio of the weight averaged molecular weight to the number averaged molecular weight depend greatly on the molecular weight of the repeating unit of polysilanes, that is, the size of the side chain molecule of the repeating unit, and hence, do not sufficiently reflect the number of Si atoms in polysilanes.

The following methods have heretofore been known as methods for preparing polysilanes:
 (1) Dehalogenative condensation reaction of dihalosilane with an alkali metal (Kipping method)
 (2) Dehydrogenative condensation of hydrosilane [see C. Aitken et al., J. Organomet. Chem., Vol. 279 (1985) p. C11]
 (3) Ring-opening polymerization of cyclic compound [see H. Sakurai et al., J. Am. Chem. Soc., Vol. 111 (1989), p. 7641/K. Matyjaszewski et al., ACS Symp. Ser. 360 (1988), p. 78]
 (4) Desalting condensation utilizing condensation of lithiosilane with a halosilane [see T. C. Williams et al., J. Polym. Sci., Vol. 19 (1981), p. 65]
 (5) Electrochemical polymerization [refer to C. Biran et al., J. Organomet. Chem., Vol. 382 (1990), p. C17/JP-A-3-104,893].

However, there are such problems that in the above methods (2) and (5), a higher molecular weight polymer is difficult to obtain and in the above methods (3) and (4), the synthesis of monomers is difficult, and the like. Therefore, as a method for synthesizing polysilanes, the Kipping method of (1) is now only one practical synthetic method.

According to the Kipping method, a relatively higher molecular weight polysilanes are obtained; however, there are such problems that the yield of a polymer having a molecular weight of such a level that sufficient characteristics as a polysilane can be exhibited, specifically a polymer having a weight averaged molecular weight of about 5,000 or more (polystyrene-reduced) is usually only about 5 to 25%, and lower molecular weight components consisting mainly of cyclic compounds are produced in a large amount. Therefore, a method for synthesizing polysilanes in a higher yield has been desired.

In the Kipping method, the reaction is conducted at a high temperature for a long period of time in the presence of an alkali metal such as metallic sodium or the like, and therefore, the side chains known of polysilanes are alkyl groups, aryl groups, diethylamino group and/or siloxy group-substituted phenyl group.

Furthermore, the Kipping method tends to be affected by steric hindrance of side chain and there have not been reported higher molecular weight polysilanes of sterically hindered groups, those of having interesting optical properties, such as triphenylamine, anthracene, phenylcarbazole and the like, but of naphthyl group.

On the other hand, a method of introducing a functional groups on the side chain of polysilanes obtained has been tried. Polysilanes, having such a side chain as not to be obtained by the Kipping method are synthesized by substituting a part of the phenyl group of a poly (methylphenylsilane) for trifluoromethanesulfonate group and further allowing an organolithium compound or an alcohol to act thereon [see W. Uhlig, J. Organomet. Chem., Vol. 402 (1991), p. C45/K. Matyjaszewski et al., Silicon Based Polymer Science, Advance in Chem. Ser. 224 ACS (1988) p. 285].

However, since in the method of functionalizing the side chain of polysilanes, a strong acid and/or an organolithium compound is used, there is a problem that the scission of silicon-silicon linkage of polysilanes is taking place, and in particular, in a reaction in which 30% or more of the side chain is functionalized, the reduction of a molecular weight becomes remarkable. Also, because of the reaction on polymer, there are such problems that the distribution of side chains cannot be controlled and that it is difficult to complete the functionalization of trifluoromethanesulfonate group which has been bonded by substitution of polysilanes, with inactive groups.

In these prior techniques, there are such problems that the organic photoconductive polymeric materials have a lower hole drift mobility though the moldability is excellent and that in the material in which a low-molecular hole transporting agent is dispersed in a resin, the moldability becomes inferior when the concentration of the low-molecular hole transporting agent is increased for enhancing the hole drift mobility. In addition, a polysilane can be mentioned as a material having a higher hole drift mobility and excellent moldability; however, conventional polysilanes having an alkyl groups and/or aryl groups have the hole drift mobility of about $10^{-4}$ cm$^2$/V/sec which is insufficient.

Moreover, though weight averaged molecular weight, number averaged molecular weight and the ratio of weight averaged molecular weight to number averaged molecular weight are used as a parameter for indicating the degree of polymerization of polysilanes, these values depend greatly upon the size of the side chain molecule in the repeating unit of polysilanes, and therefore, are not always sufficient as parameters for indicating the number of Si atoms in polysilanes such number is important for enhancing the hole drift mobility and moldability of polysilanes.

In addition, in the method of synthesizing polysilanes, the Kipping method is the only one practical method, and this method is easily affected by the steric hindrance of side chain, as a result of which a higher molecular weight polysilanes having a bulky side chain have never been synthesized. In the method of functionalizing a higher molecular weight polysilanes with bulky side chains, the silicon-silicon linkage in the main chain is cut and the molecular weight is lowered.

SUMMARY OF THE INVENTION

In view of the above-mentioned prior art problems, the present inventors have made extensive research on a method for enhancing the hole drift mobility of polysilanes and a method for synthesizing a higher molecular weight polysilane excellent in moldability, and have consequently found that by polymerizing a dihalosilane having a specific substituent in the side chain using a specific reaction method, there can be produced a polysilane having a higher molecular weight and a higher hole drift mobility, to complete this invention.

An object of this invention is to provide polysilanes having such a higher molecular weight that the material can exhibit an excellent moldability as a polymeric material and having a higher hole drift mobility.

A further object of this invention is to provide a process for producing the above polysilanes.

A still further object of this invention is to provide a dihalosilane which is the starting material of the polysilanes.

Other objects and advantages of this invention will become apparent from the following description.

According to this invention, there are provided polysilanes whose main chain skeleton consists of a repeating unit represented by the general formula (1):

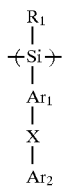   (1)

wherein $R_1$ represents a substituted or unsubstituted alkyl, cycloalkyl, aryl or aralkyl group; X is an atom having an unpaired electron or a group containing an atom having an unpaired electron and represents an oxygen atom, a sulfur atom or a nitrogen atom-containing group represented by the general formula (2):

   (2)

in which $R_2$ represents a substituted or unsubstituted alkyl, cycloalkyl, aryl or aralkyl group; $Ar_1$ represents a substituted or unsubstituted arylene group; $Ar_2$ represents a substituted or unsubstituted aryl group, a group having an aromatic amine skeleton represented by the general formula (3):

   (3)

in which $Ar_3$ represents a substituted or unsubstituted arylene group, each of $R_3$ and $R_4$ represents independently a substituted or unsubstituted alkyl, cycloalkyl, aryl or aralkyl group, or a group having an aromatic ethenylene skeleton represented by the general formula (4):

   (4)

in which $Ar_4$ represents a substituted or unsubstituted arylene group, each of $R_5$ and $R_6$ represents independently a hydrogen atom or a substituted or unsubstituted alkyl, cycloalkyl, aryl or aralkyl group and $Ar_5$ represents a substituted or unsubstituted aryl group; and $Ar_1$ and $Ar_2$ may be bonded to each other to form a ring together with the X atom to which they are bonded or when X is a group represented by the general formula (2), $Ar_1$ and $R_2$ or $R_2$ and $Ar_2$ may be bonded to each other to form a ring together with the N atom to which they are bonded, and a repeating unit represented by the general formula (5):

   (5)

wherein each of $R_7$ and $R_8$ represents independently a substituted or unsubstituted alkyl, cycloalkyl, aryl or aralkyl group;

the ratio of the number of the repeating units (1) to and the ratio of the number of the repeating units (5) to the total number of the repeating units (1) and the repeating units (5), these ratios being indicated as z and 1−z, respectively, satisfy $0.2 \leq z \leq 1$.

This invention also provides a dihalosilane represented by the general formula (7):

   (7)

wherein Y represents a chlorine atom, a bromine atom or an iodine atom; $R_1$ represents a substituted or unsubstituted alkyl, cycloalkyl, aryl or aralkyl group; X is an atom having an unpaired electron or a group containing an atom having an unpaired electron, and represents an oxygen atom, a sulfur atom or a nitrogen atom-containing group represented by the above general formula (2); $Ar_1$ represents a substituted or unsubstituted arylene group; $Ar_2$ represents a substituted or unsubstituted aryl group, a group having an aromatic amine skeleton represented by the above general formula (3) or a group having an aromatic ethenylene skeleton represented by the above general formula (4); and $Ar_1$ and $Ar_2$ may be bonded to each other to form a ring together with the X atom to which they are bonded or when X is a group represented by the general formula (2), $Ar_1$ and $R_2$ or $R_2$ and $Ar_2$ may be bonded to each other to form a ring together with the N atom to which they are bonded.

This invention still further provides a process for producing a polysilane which comprises polycondensing a dihalosilane represented by the above-mentioned general formula (7) or a mixture of a dihalosilane represented by the above-mentioned general formula (7) and a dihalosilane represented by the following general formula (8) with an alkali metal in an inert solvent:

(8)

wherein Y represents a chlorine atom, a bromine atom or an iodine atom; and $R_7$ and $R_8$ are the same as defined in the above general formula (5).

DETAILED DESCRIPTION OF THE INVENTION

The polysilane of this invention is characterized by having a repeating unit represented by the general formula (1) in the main chain skeleton. Also, the dihalosilane of this invention is characterized by being represented by the general formula (7).

In the repeating unit represented by the general formula (1) and the dihalosilane represented by the general formula (7), $R_1$ is preferably a substituted or unsubstituted, straight chain or branched alkyl having 1 to 10 carbon atoms, a substituted or unsubstituted cycloalkyl group having not more than 10 carbon atoms, a substituted or unsubstituted aryl group having 6 to 24 carbon atoms or a substituted or unsubstituted aralkyl group having 7 to 26 carbon atoms.

Specifically, the alkyl group includes methyl group, ethyl group, n-propyl group, isopropyl group, n-butyl group, sec-butyl group, tert-butyl group, pentyl group, hexyl group, octyl group, dodecyl group and the like; the cycloalkyl group includes cyclohexyl group and the like; and the aryl group includes phenyl group, naphthyl group, anthryl group, biphenyl group and the like; the aralkyl group includes benzyl group, phenethyl group, p-methylbenzyl group and the like.

Here, the substituents of the substituted or unsubstituted alkyl, cycloalkyl, aryl and aralkyl groups include straight chain or branched alkyl groups having 1 to 6 carbon atoms and cycloalkyl groups having not more than 6 carbon atoms, for example, methyl group, ethyl group, n-propyl group, isopropyl group, n-butyl group, sec-butyl group, tert-butyl group, pentyl group, hexyl group, cyclohexyl group and the like.

In the repeating unit represented by the general formula (1) and the dihalosilane represented by the general formula (7), the substituted or unsubstituted arylene group $Ar_1$ is preferably a substituted or unsubstituted arylene group having 6 to 24 carbon atoms. Specifically, substituted or unsubstituted phenylene, naphthylene, anthrylene and biphenylene groups and the like are mentioned. However, particularly preferable is a substituted or unsubstituted phenylene group.

The atom having an unpaired electron or the group containing an atom having an unpaired electron, which is X, is an oxygen atom, a sulfur atom or a nitrogen atom-containing group represented by the general formula (2), preferably a group which contains a nitrogen atom as the atom having an unpaired electron and which is represented by the general formula (2).

In the general formula (2), the group $R_2$ bonded to the nitrogen atom is preferably a substituted or unsubstituted, straight chain or branched alkyl group having 1 to 10 carbon atoms or a cycloalkyl group having not more than 10 carbon atoms, a substituted or unsubstituted aryl group having 6 to 24 carbon atoms or a substituted or unsubstituted aralkyl group having 7 to 26 carbon atoms, more preferably a substituted or unsubstituted aryl group having 6 to 24 carbon atoms.

Specifically, the alkyl group includes methyl group, ethyl group, n-propyl group, isopropyl group, n-butyl group, sec-butyl group, tert-butyl group, pentyl group, hexyl group, octyl group, decyl group and like; the cycloalkyl group includes cyclohexyl group and the like; the aryl group includes phenyl group, naphthyl group, anthryl group, biphenyl group and the like; the aralkyl group includes benzyl group, phenethyl group, p-methylbenzyl group and the like. $R_2$ is particularly preferably a substituted or unsubstituted phenyl group.

Here, the substituents of the substituted or unsubstituted alkyl, cycloalkyl, aryl and aralkyl groups include straight chain or branched alkyl groups having 1 to 6 carbon atoms and substituted or unsubstituted cycloalkyl groups having not more than 6 carbon atoms, for example, methyl group, ethyl group, n-propyl group, isopropyl group, n-butyl group, sec-butyl group, tert-butyl group, pentyl group, hexyl group, cyclohexyl group and the like.

In $Ar_2$ bonded to X in the general formula (1) and the general formula (7), the substituted or unsubstituted aryl group has preferably 6 to 24 carbon atoms and includes phenyl group, naphthyl group, anthryl group, biphenyl group and the like, and particularly preferable is a substituted or unsubstituted phenyl group.

In the group having an aromatic amine skeleton represented by the general formula (3), the substituted or unsubstituted arylene group $Ar_3$ is preferably a substituted or unsubstituted arylene group having 6 to 24 carbon atoms and includes phenylene group, naphthylene group, anthrylene group, biphenylene group and the like, and particularly preferable is a substituted or unsubstituted phenylene or biphenylene group.

In the group having an aromatic amine skeleton represented by the general formula (3), $R_3$ and $R_4$ are preferably substituted or unsubstituted straight chain or branched alkyl groups having 1 to 10 carbon atoms or cycloalkyl groups having not more than 10 carbon atoms, substituted or unsubstituted aryl groups having 6 to 24 carbon atoms, or substituted or unsubstituted aralkyl groups having 7 to 26 carbon atoms, more preferably substituted or unsubstituted aryl groups having 6 to 24 carbon atoms, and particularly preferably substituted or unsubstituted phenyl groups.

In the group having an aromatic ethenylene skeleton represented by the general formula (4), the substituted or unsubstituted arylene group $Ar_4$ is preferably a substituted or unsubstituted arylene group having 6 to 24 carbon atoms and includes substituted or unsubstituted phenylene, naphthylene, anthrylene and biphenylene groups and the like. Particularly preferable is a substituted or unsubstituted phenylene group. The substituted or unsubstituted aryl group $Ar_5$ is preferably a substituted or unsubstituted aryl group having 6 to 24 carbon atoms and includes substituted or unsubstituted phenyl, naphthyl, anthryl and biphenyl groups and the like. Particularly preferable is a substituted or unsubstituted phenyl group.

In the group having an aromatic ethenylene skeleton represented by the general formula (4), $R_5$ and $R_6$ other than hydrogen atom are preferably substituted or unsubstituted, straight chain or branched alkyl groups having 1 to 10 carbon atoms or substituted or unsubstituted cycloalkyl groups having not more than 10 carbon atoms, substituted or unsubstituted aryl groups having 6 to 24 carbon atoms or substituted or unsubstituted aralkyl groups having 7 to 26 carbon atoms, more preferably substituted or unsubstituted aryl groups having 6 to 24 carbon atoms, and particularly preferably substituted or unsubstituted phenyl groups.

As the side chain group $Ar_2$—X—$Ar_1$— in the repeating unit represented by the general formula (1) which is the characteristic feature of the polysilane compound of this invention, it is preferable to select such a side chain group that a molecule of the formula (6) corresponding to said side chain:

$$H—Ar_1—X—Ar_2 \quad (6)$$

wherein H means a hydrogen atom, $Ar_1$, X and $Ar_2$ are as defined in the general formula (1) has an ionization potential (referred to hereinafter as Ip in some cases) of not more than 6.0 eV.

The ionization potential gives some insights of the extent to the delocalization of σ and/or π electrons. The more delocalization of electrons occures, the bigger size of hopping site becomes. In the case of polysilane with side chain groups having π electrons, the interaction between the main chain and the side chain delocalizes σ electrons in the silicon-silicon bonds and π electrons through whole molecule. Therefore, a polysilane having side chains of a smaller ionization potential becomes a superior hopping site in size. As a result, the probability of hopping of holes from one site to another increase, so that such side chain groups are preferred.

When the ionization potential is higher than 6.0 eV, the spread of the hopping site to side chain is not sufficient, and the probability that hole hops from one hopping site to another does not become high, and the hole drift mobility is difficult to enhance.

The side chain group $Ar_2$—X—$Ar_1$— in the repeating unit represented by the general formula (1) and the dihalosilane represented by the general formula (7) which are the characteristic features of the polysilane and dihalosilane of this invention includes the specific examples mentioned below; however, this invention is not limited thereto. In the following formulas, W represents an oxygen atom (O) or a sulfur atom (S) and each of $R_1$ to $R_9$ represents a methyl group, an ethyl group, an n-propyl group, an isopropyl group, an n-butyl group, a sec-butyl group, a tert-butyl group, a pentyl group, a hexyl group, a cyclohexyl group or the like. Also, m represents an integer of 0 or 1, n represents an integer of 0 to 2, o represents an integer of 0 to 3, p represents an integer of 0 to 4 and q represents an integer of 0 to 5.

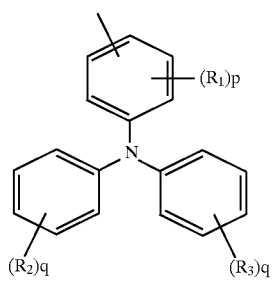

-continued

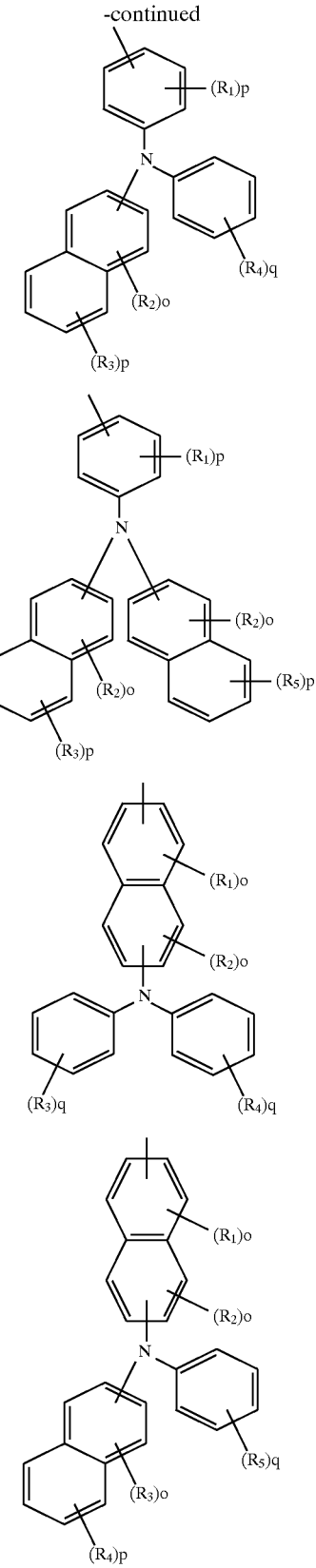

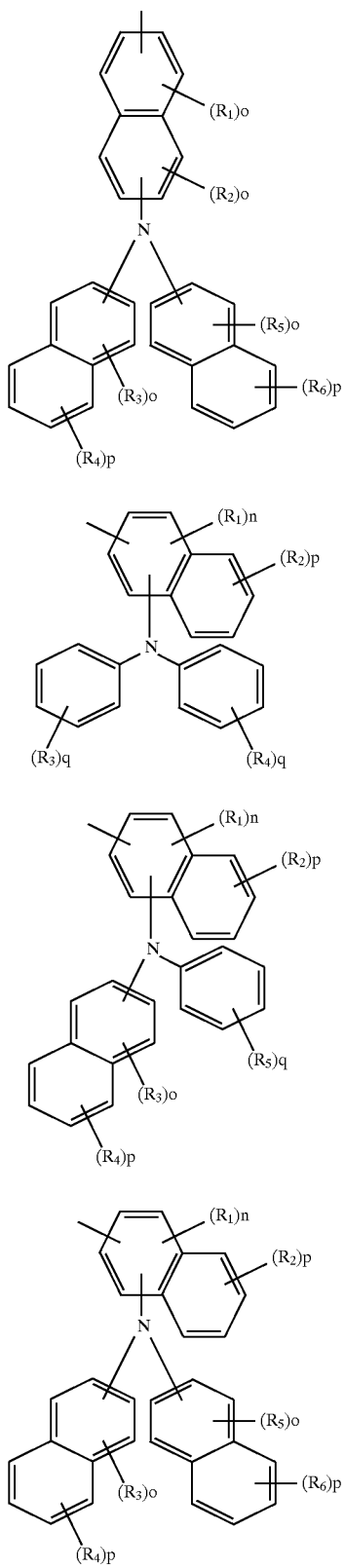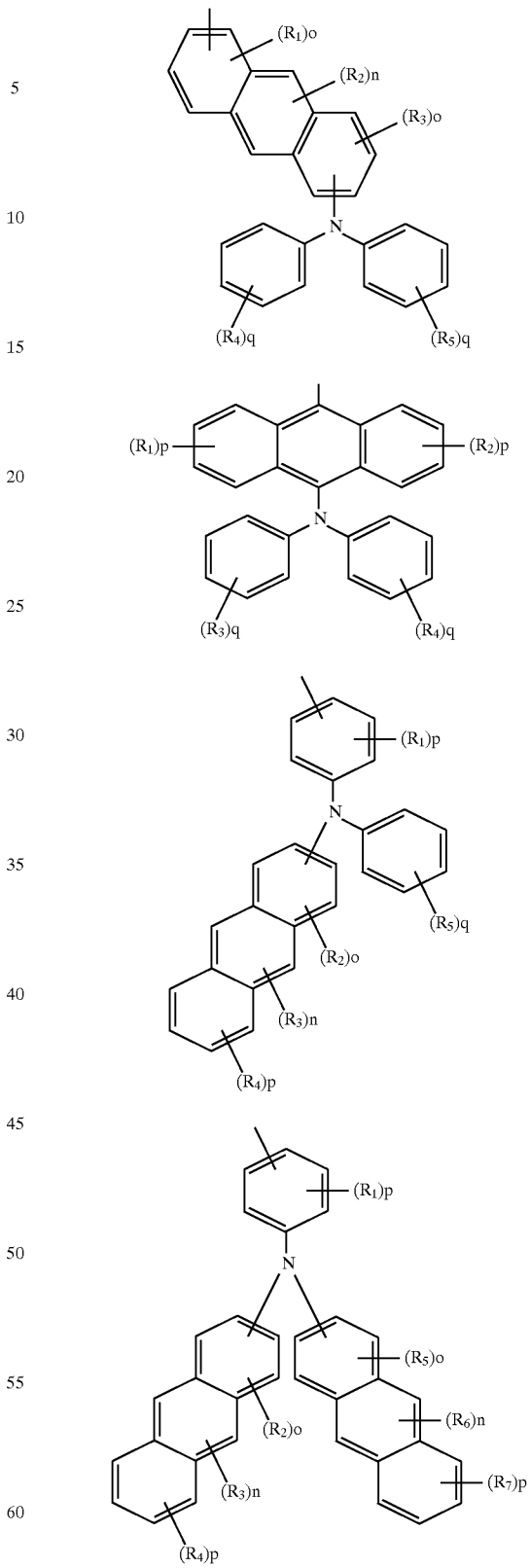

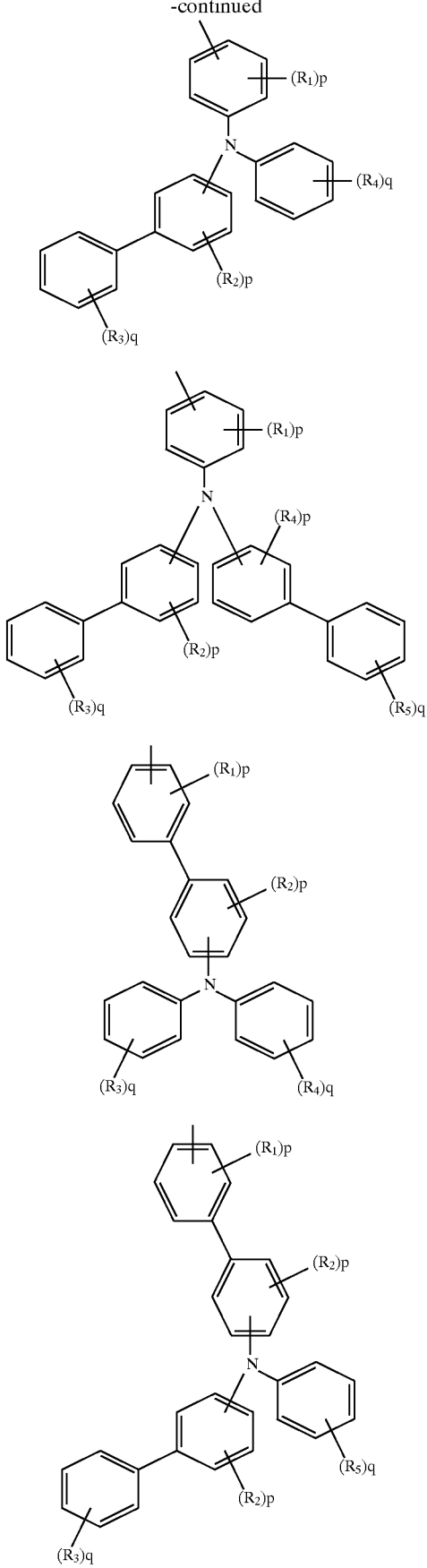
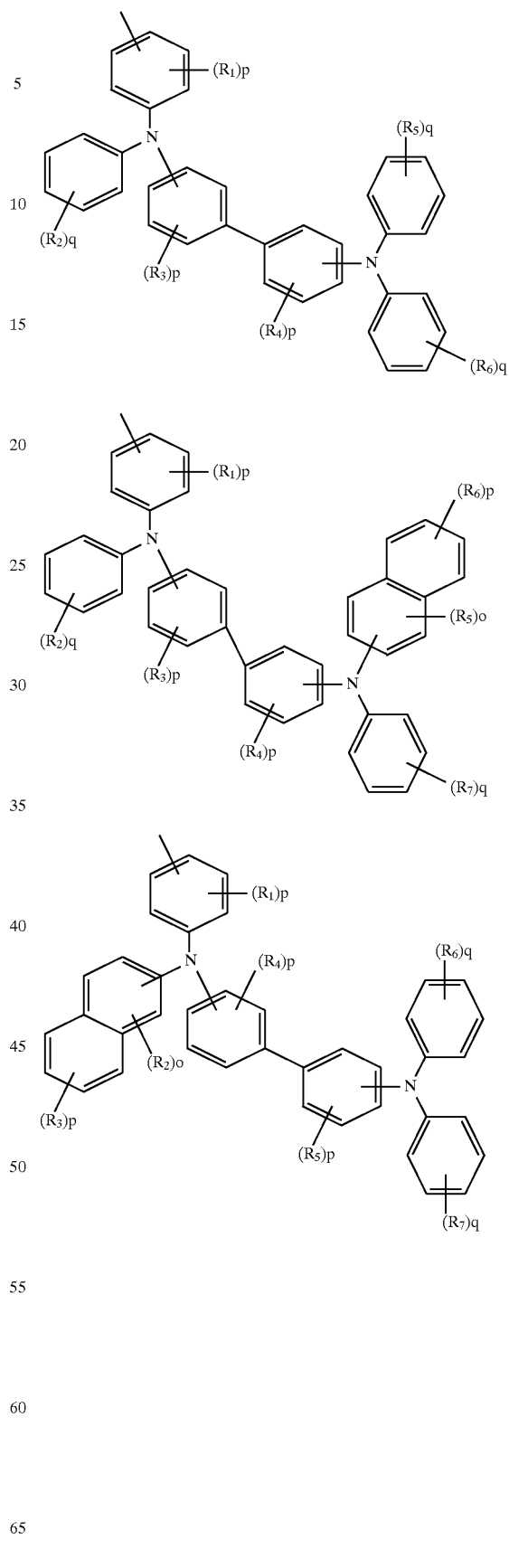

-continued
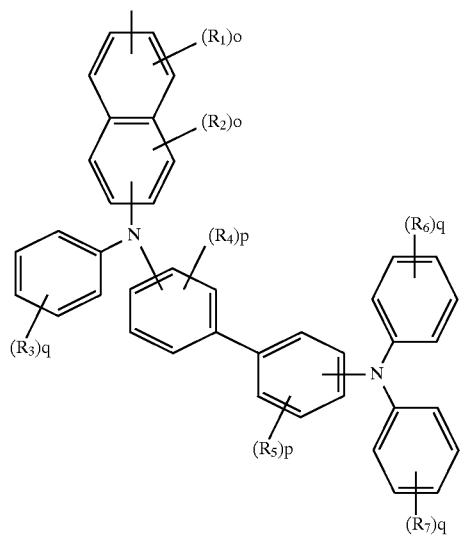
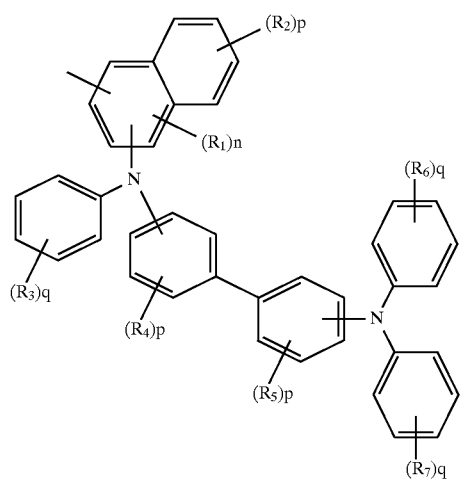
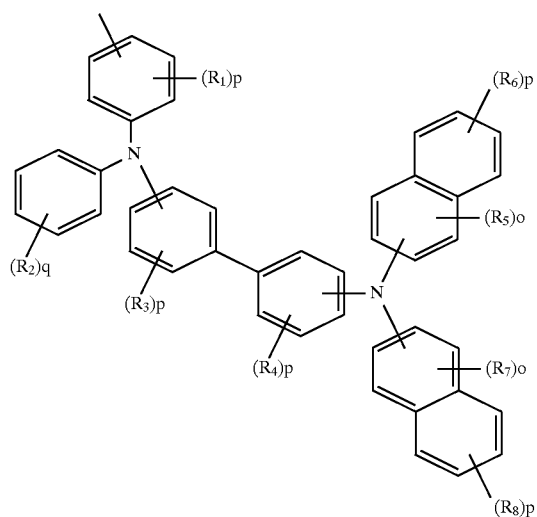
-continued
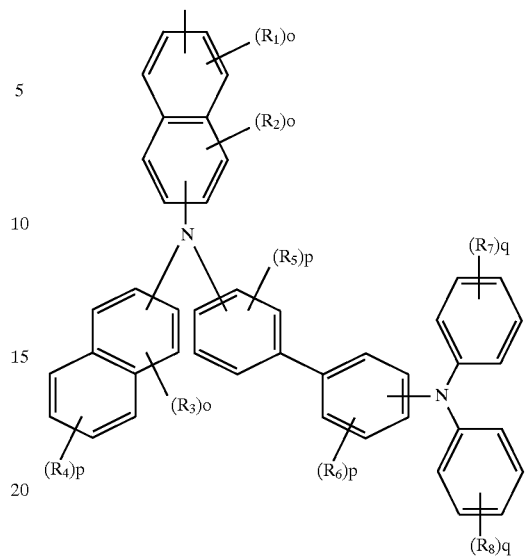
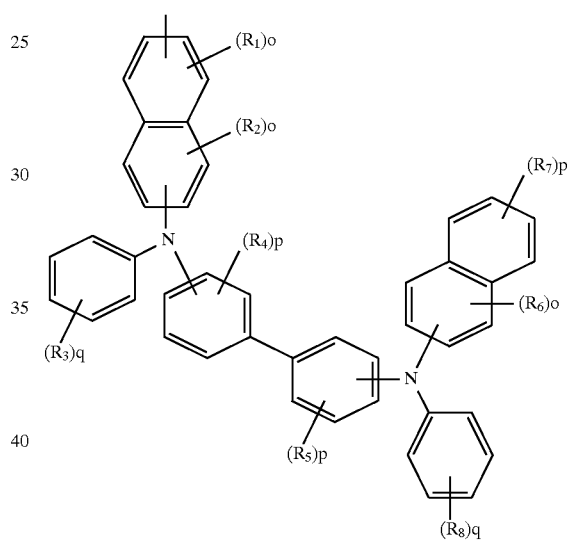
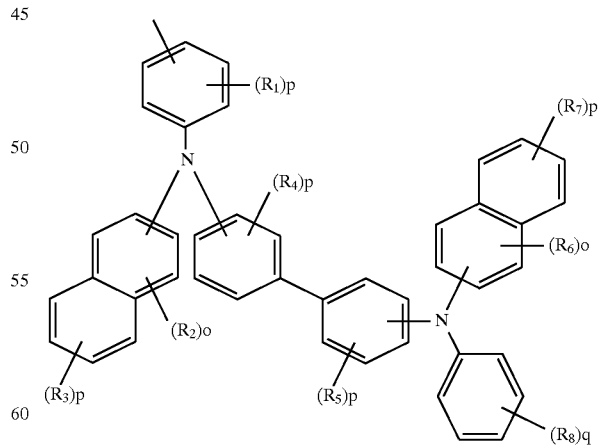

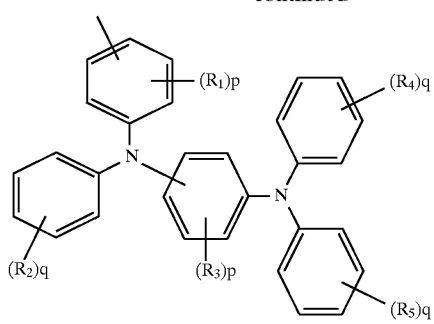
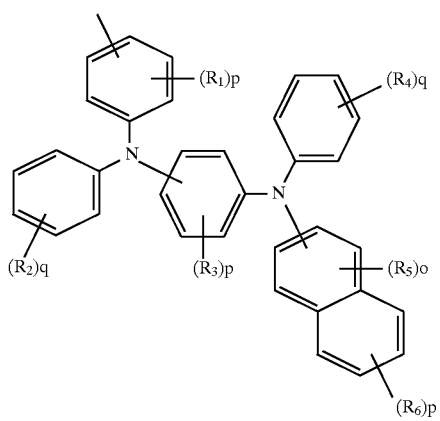
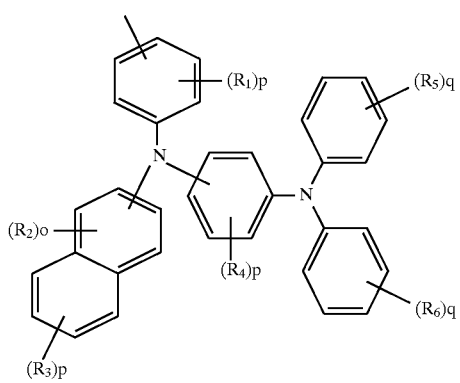
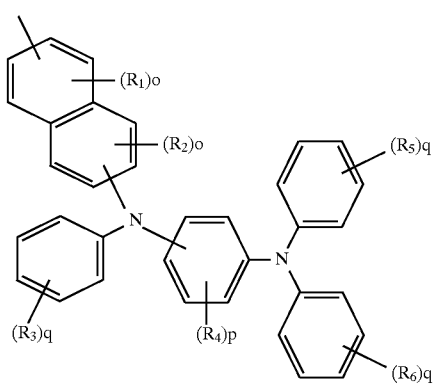
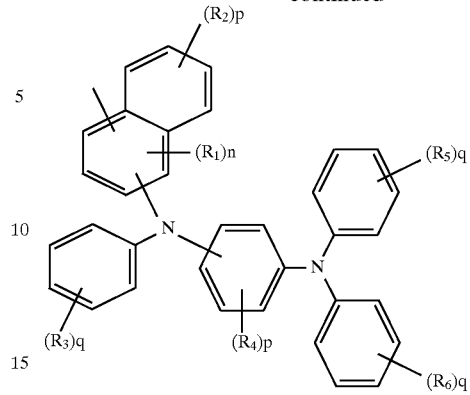
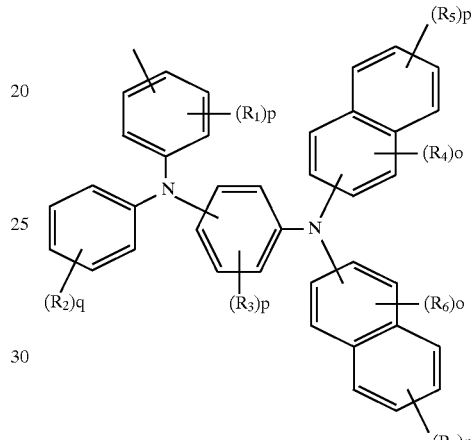
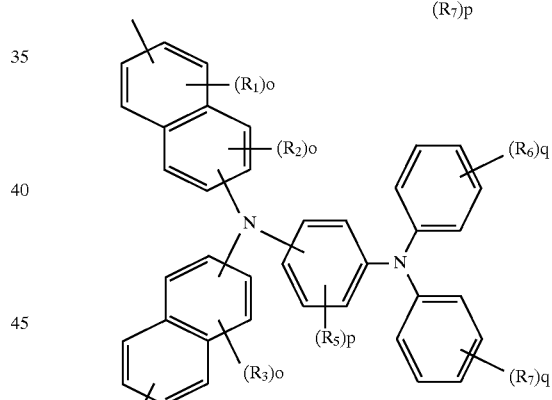
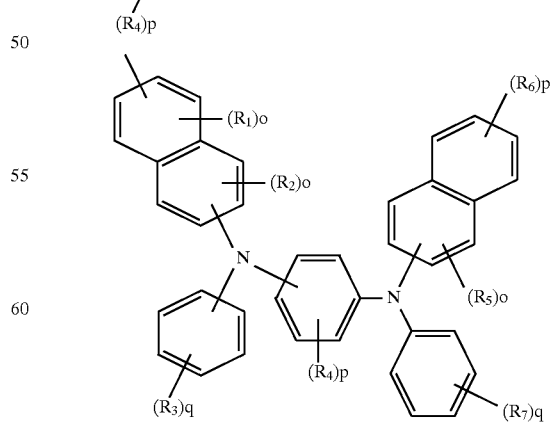

-continued
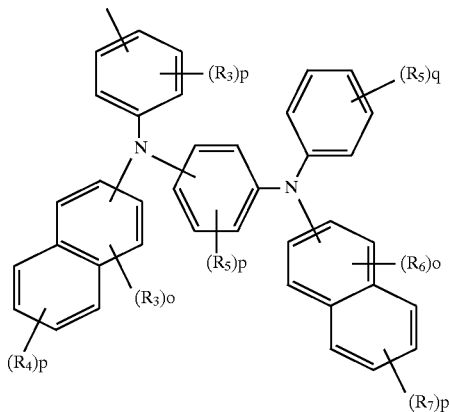
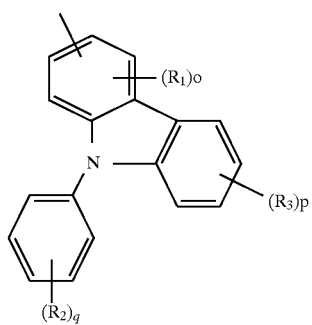
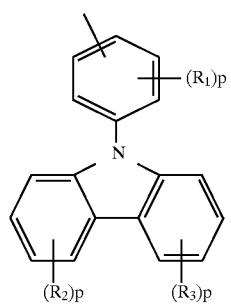
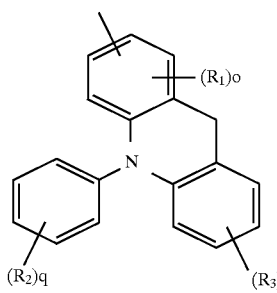
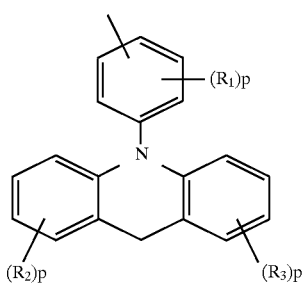
-continued
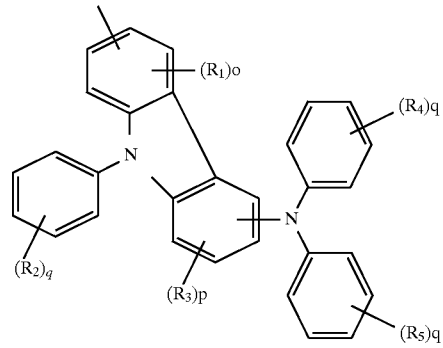
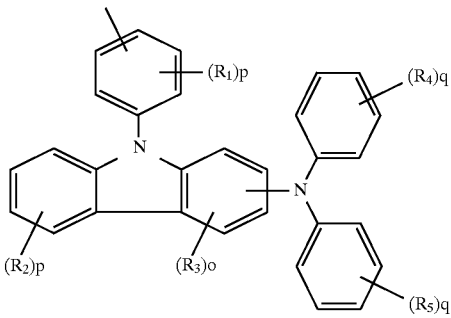
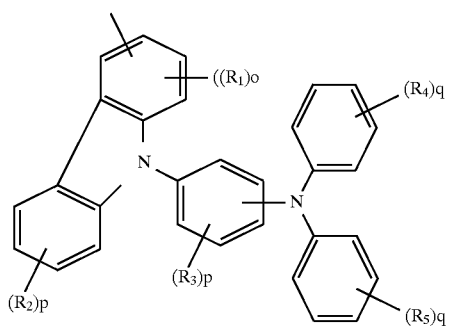
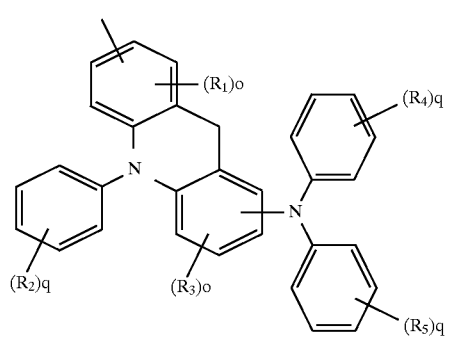
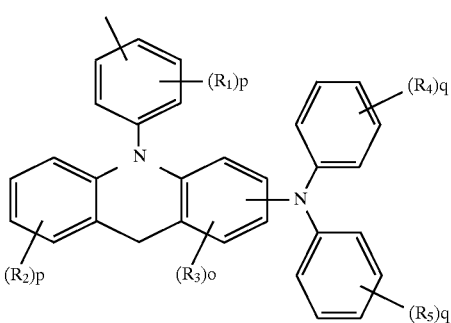

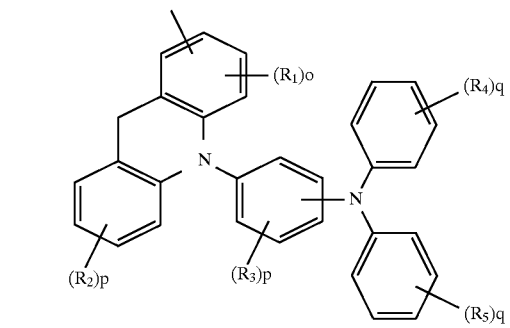
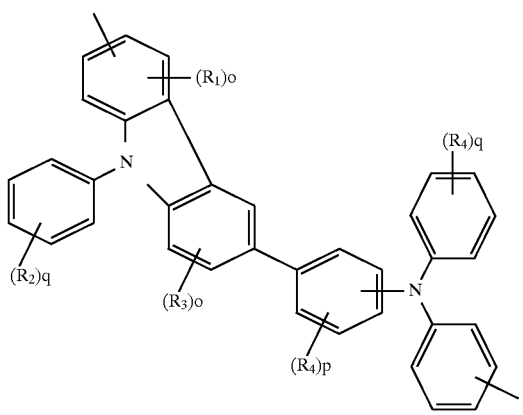
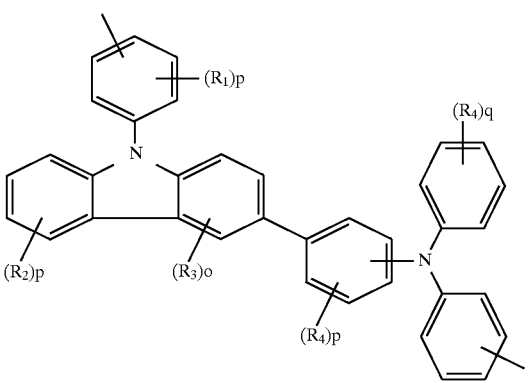
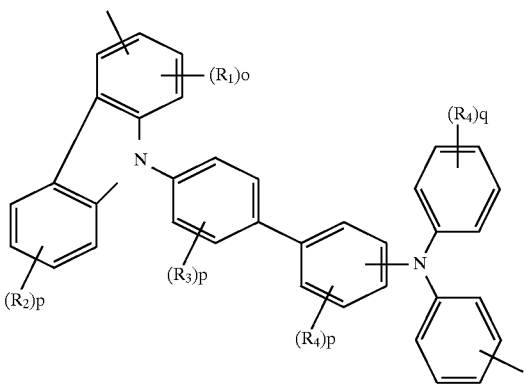
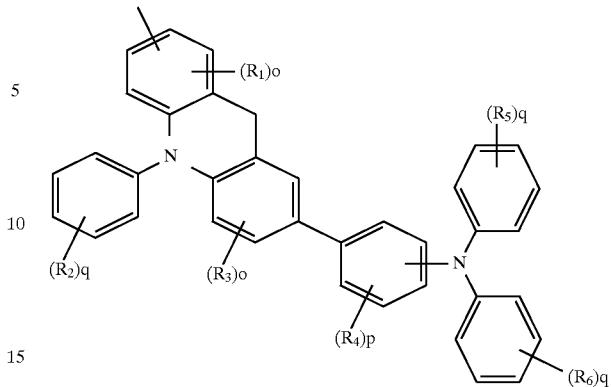
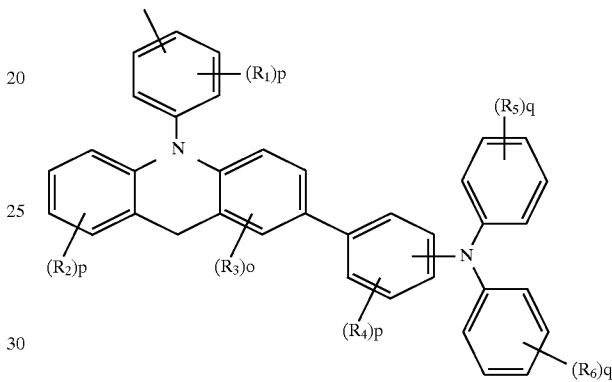
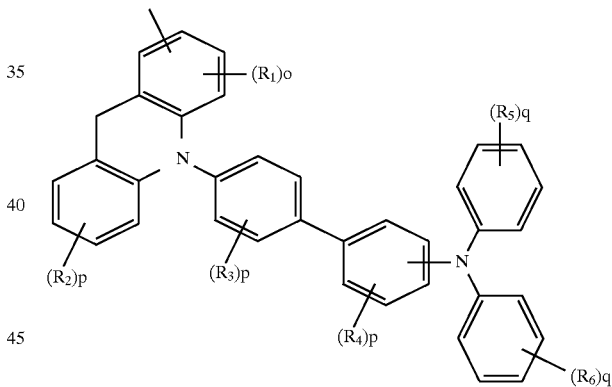
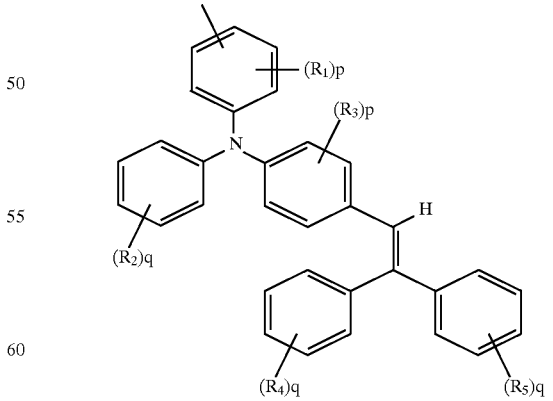

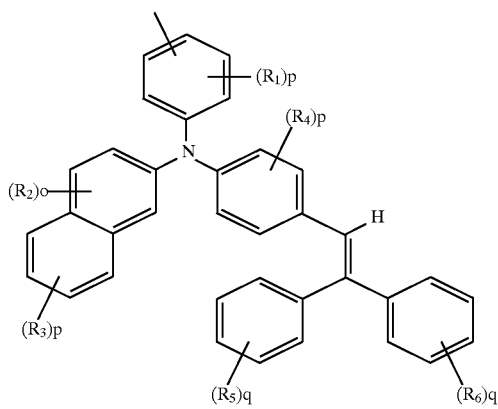
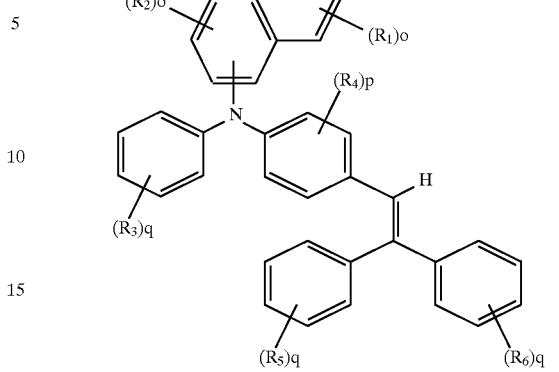
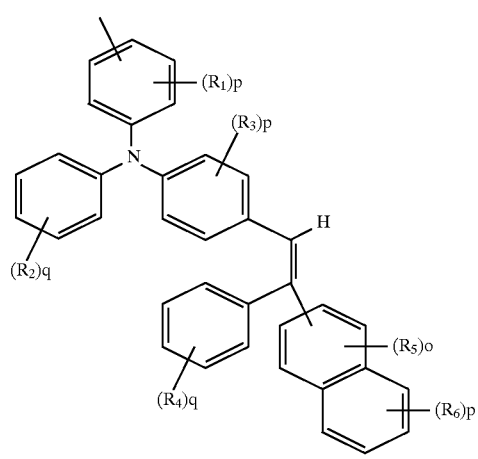
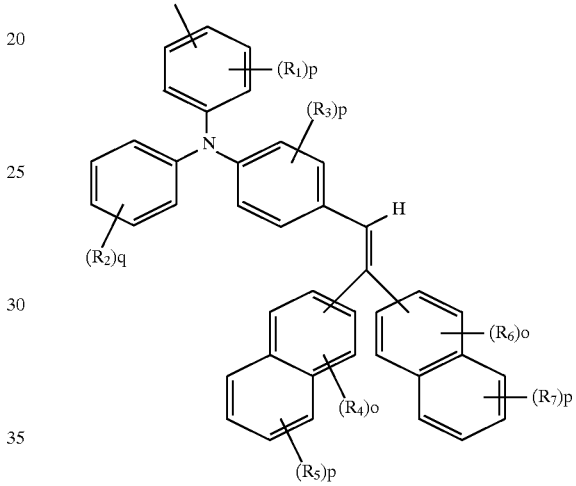
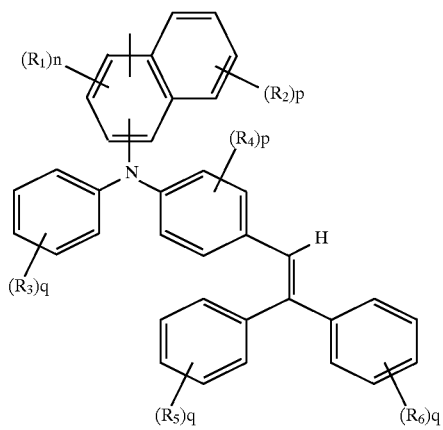
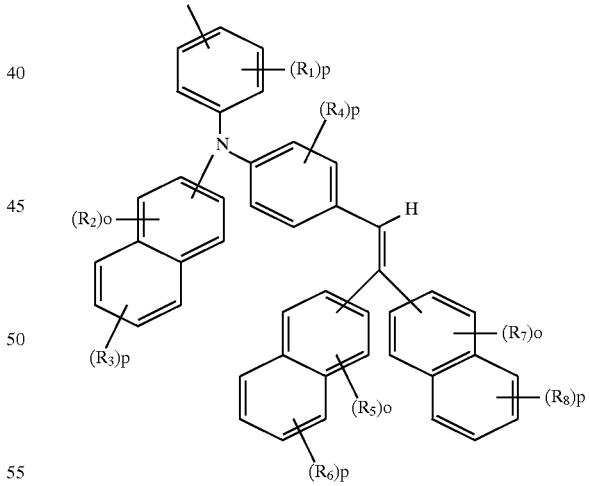

-continued
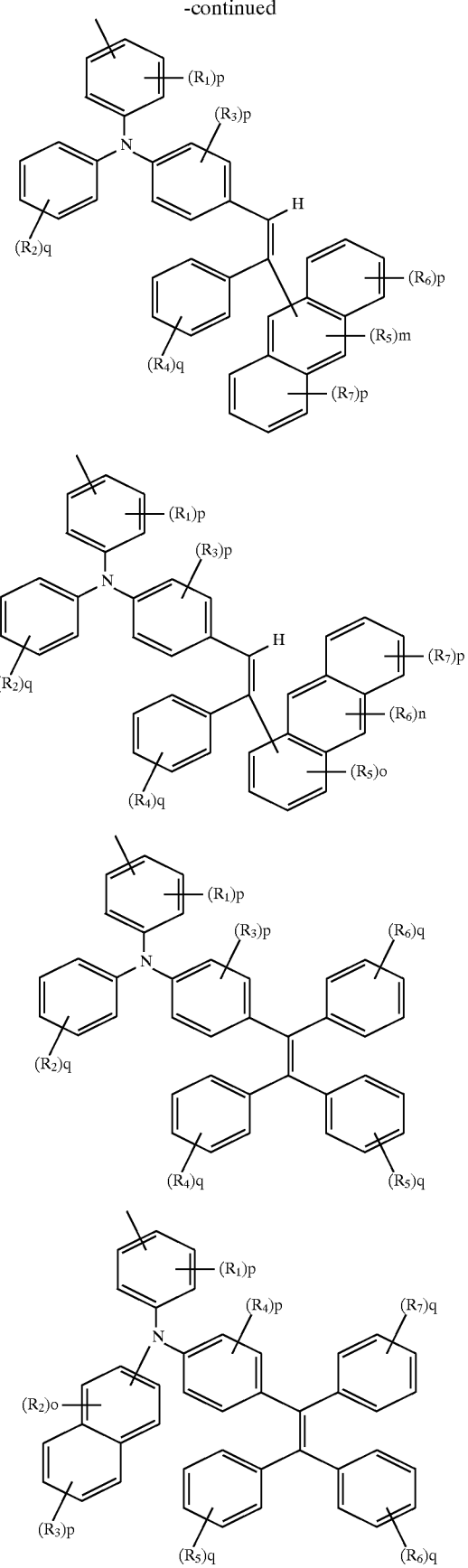
-continued
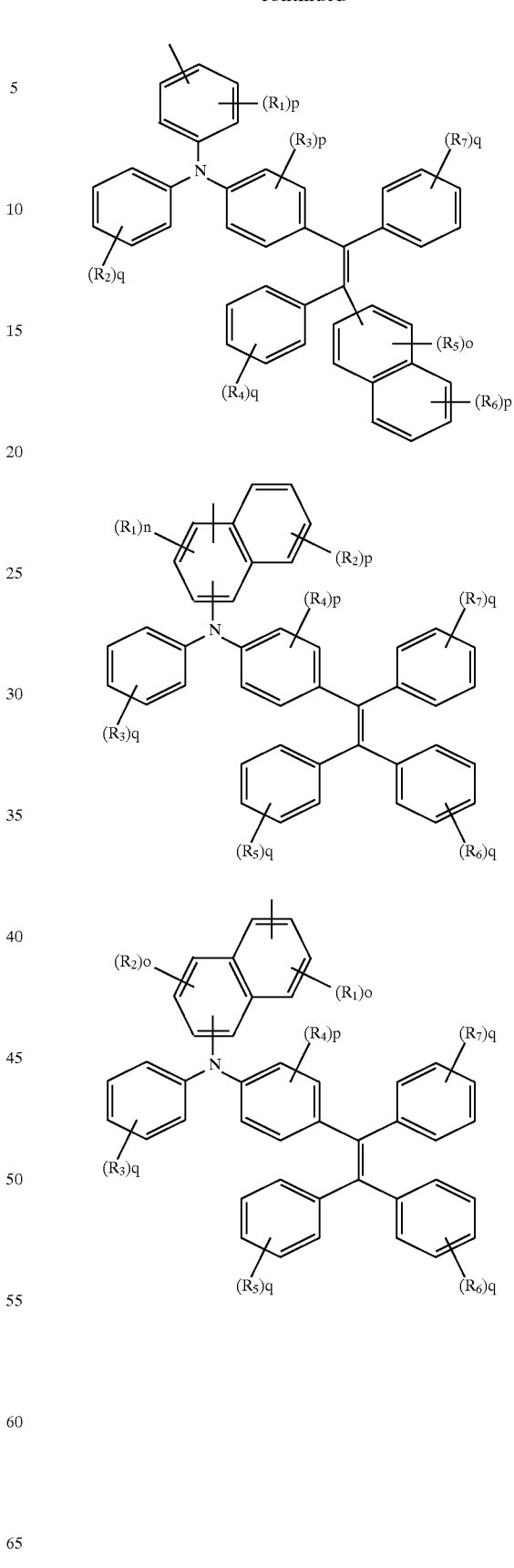

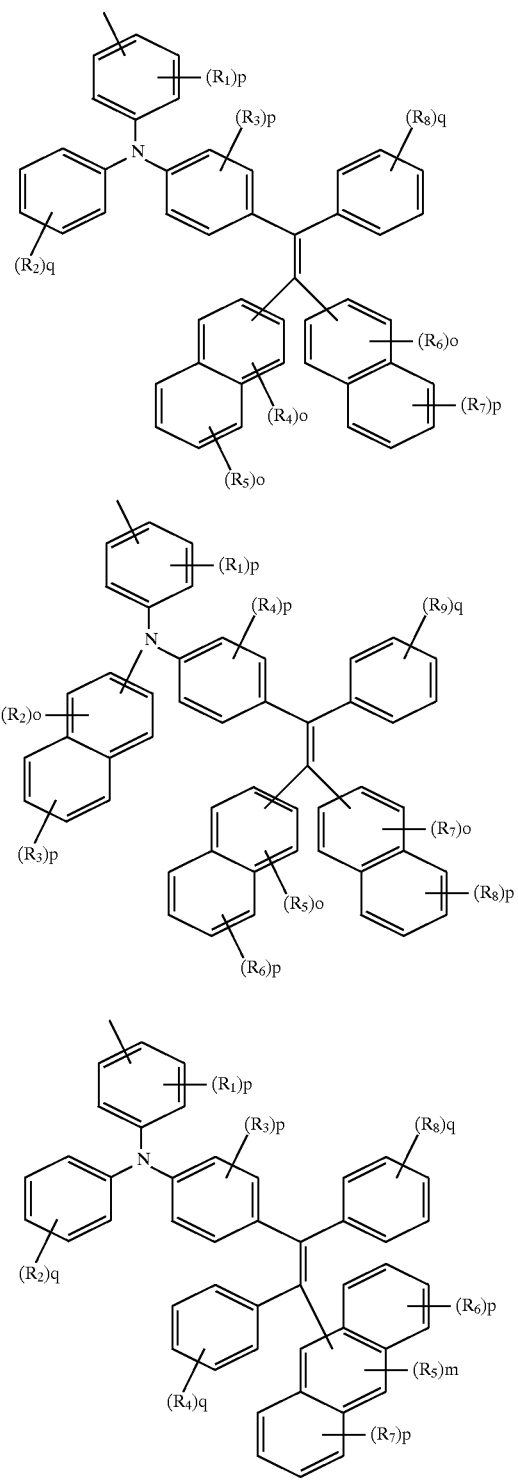
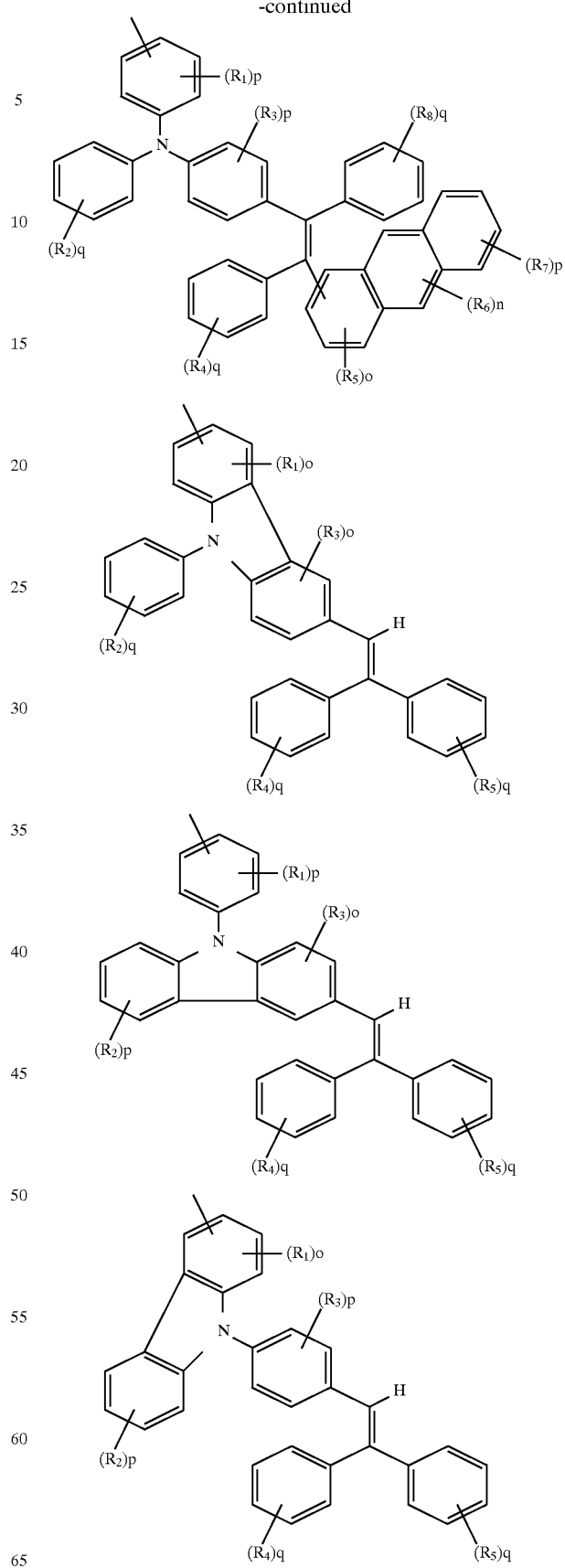

29
-continued
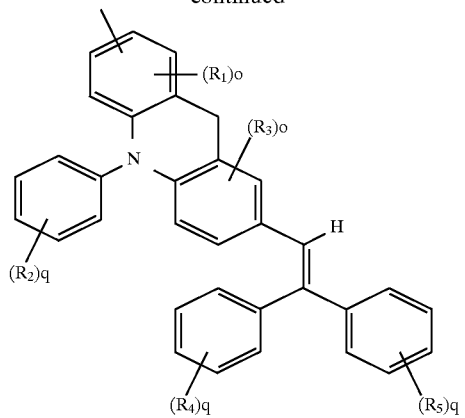
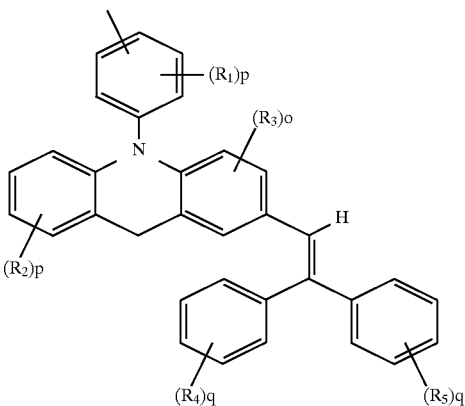
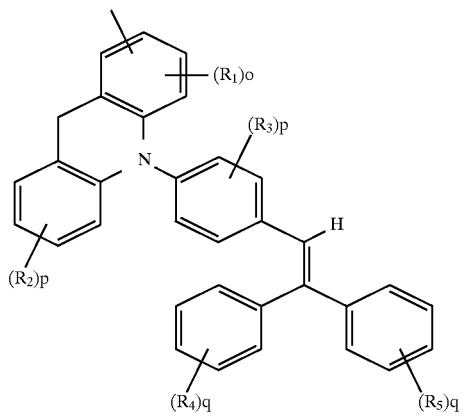
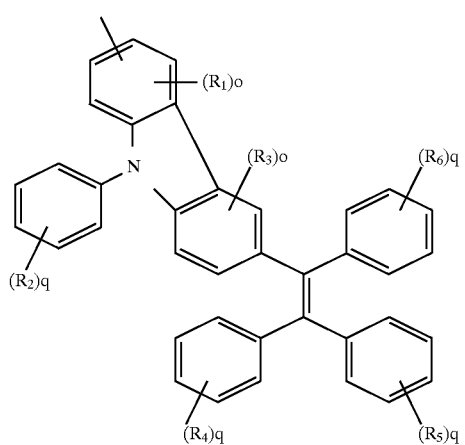
30
-continued
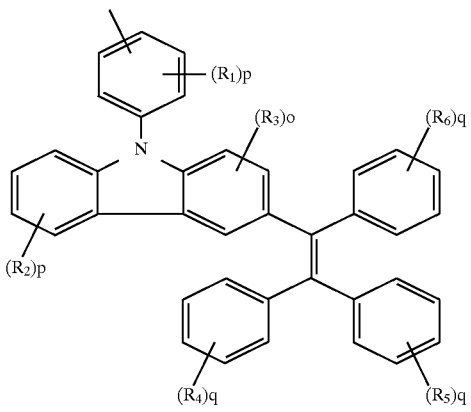
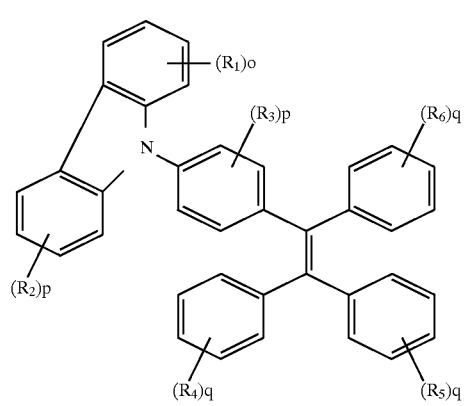
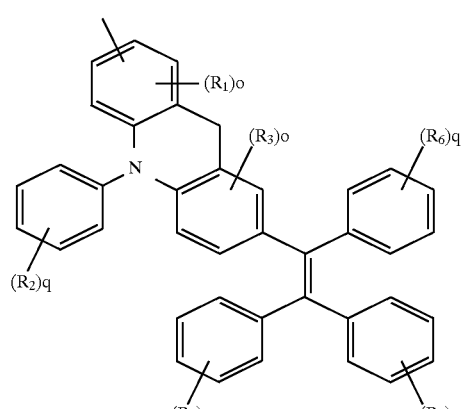
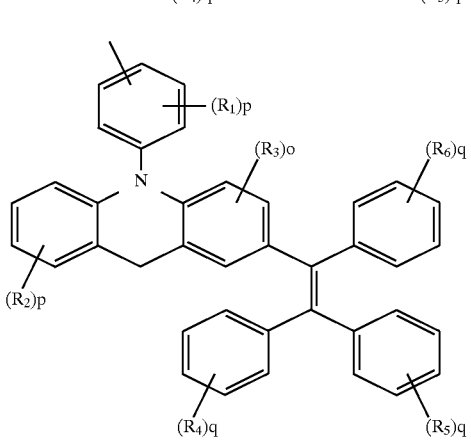

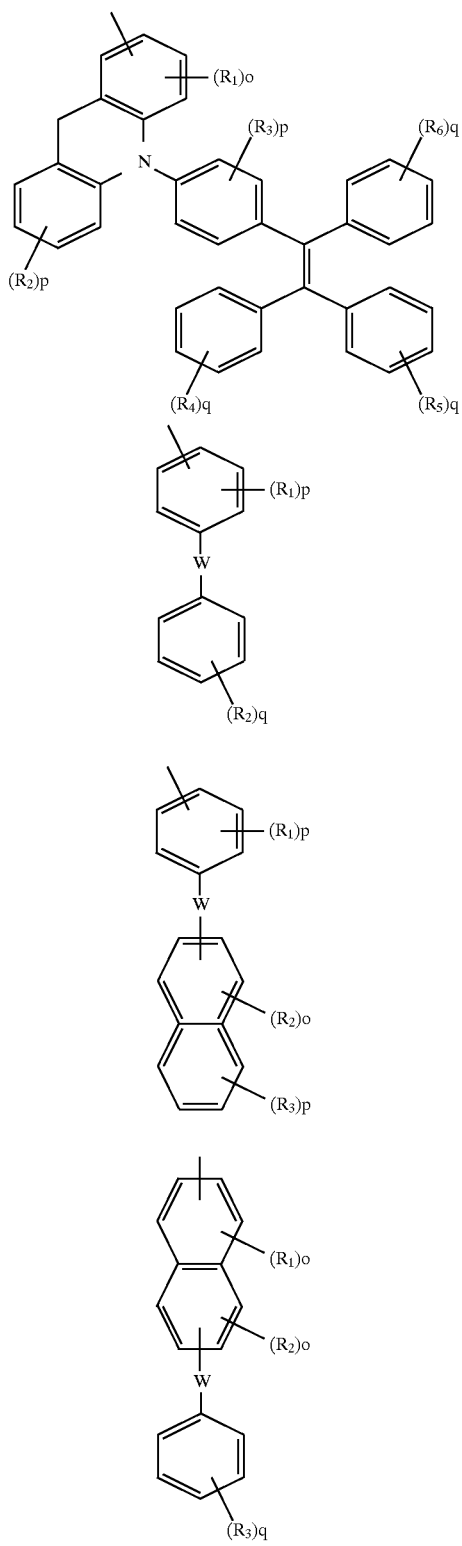
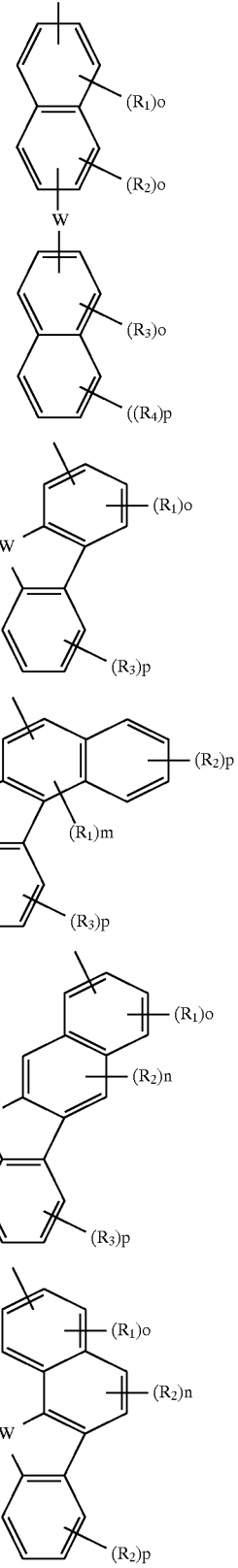

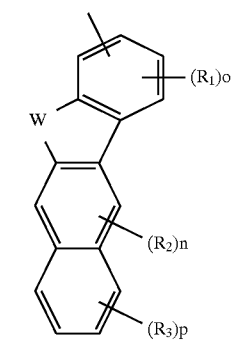
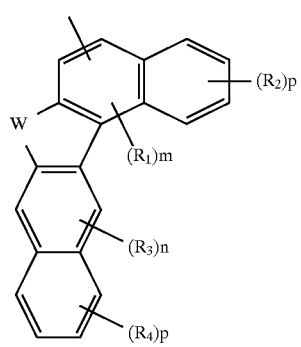
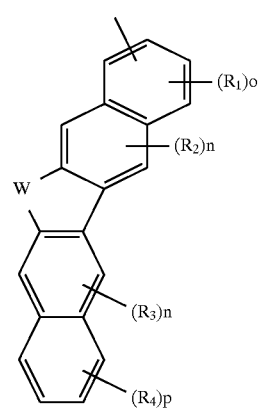
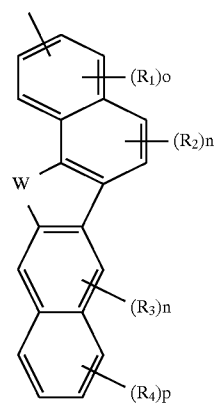
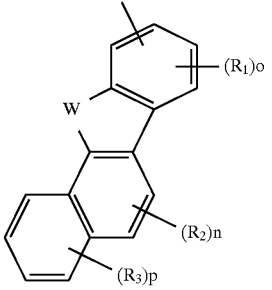
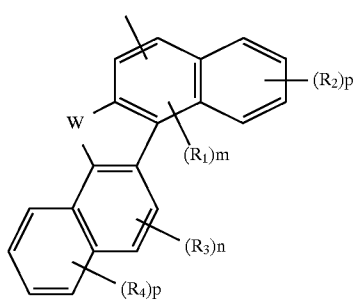
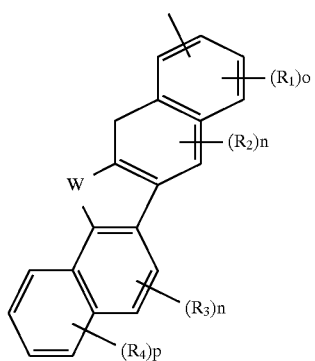
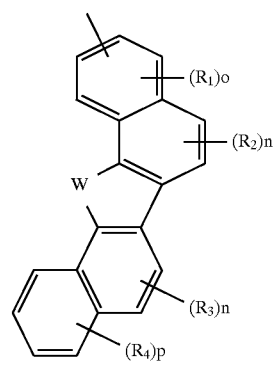
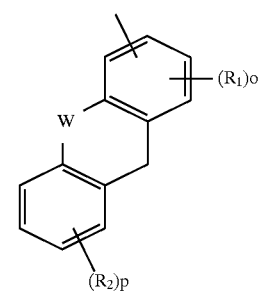

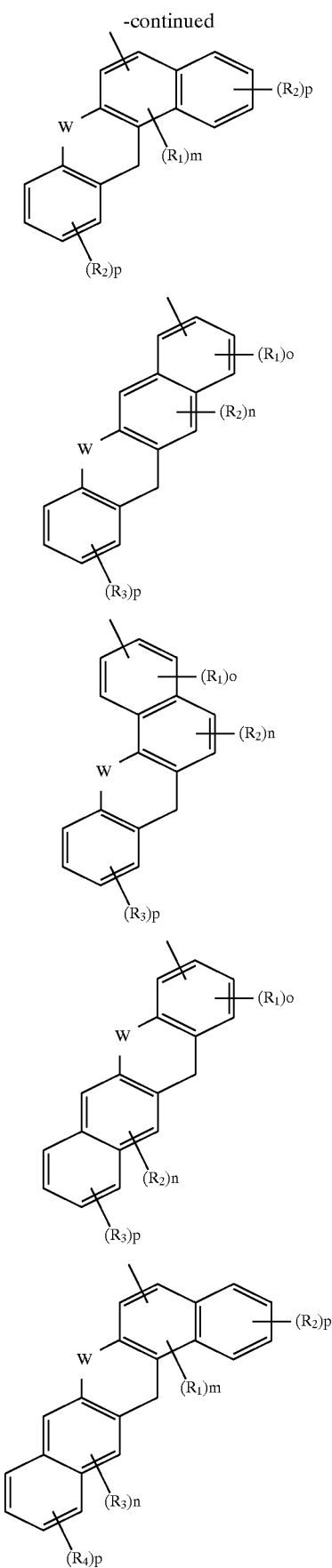
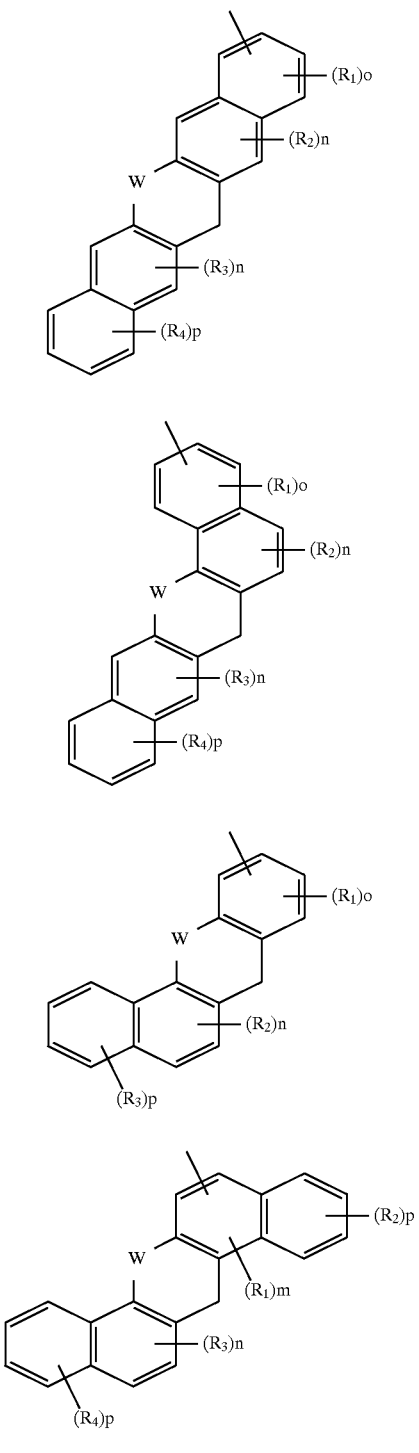

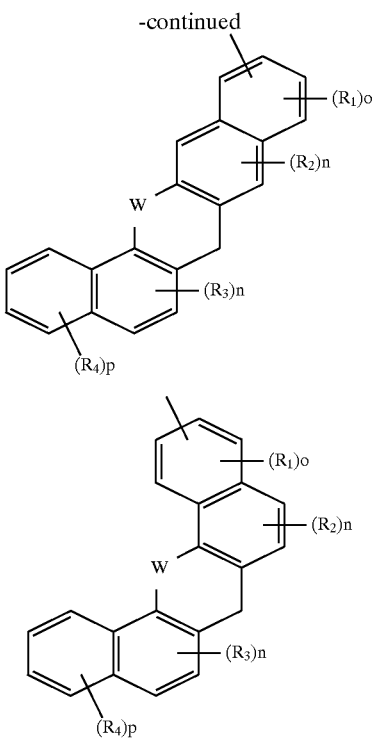

In the repeating unit represented by the general formula (5) of the polysilane of this invention and the dihalosilane represented by the general formula (8) of this invention, each of $R_7$ and $R_8$ represents independently preferably a substituted or unsubstituted, straight chain or branched alkyl group having 1 to 10 carbon atoms, a substituted or unsubstituted cycloalkyl group having not more than 10 carbon atoms, a substituted or unsubstituted aryl group having 6 to 24 carbon atoms or a substituted or unsubstituted aralkyl group having 7 to 26 carbon atoms.

Specifically, for example, the alkyl group includes methyl group, ethyl group, n-propyl group, isopropyl group, n-butyl group, sec-butyl group, tert-butyl group, pentyl group, hexyl group, octyl group, dodecyl group and the like; the cycloalkyl group includes cyclohexyl group; the aryl group includes phenyl group, naphthyl group, anthryl group, biphenyl group and the like; and the aralkyl group includes benzyl group, phenethyl group, p-methylbenzyl group and the like.

The substituents of the substituted or unsubstituted alkyl, cycloalkyl, aryl and aralkyl groups are preferably straight chain or branched alkyl groups having 1 to 6 carbon atoms or substituted or unsubstituted cycloalkyl groups having not more than 6 carbon atoms, and there can be mentioned, for example, methyl group, ethyl group, n-propyl group, isopropyl group, n-butyl group, sec-butyl group, tert-butyl group, pentyl group, hexyl group, cyclohexyl group and the like.

In the repeating unit represented by the general formula (1) for the polysilane of this invention and the dihalosilane represented by the formula (7) of this invention, X is preferably a nitrogen atom-containing group represented by the general formula (2), and it is preferable that $R_2$ is a substituted or unsubstituted phenyl group, $Ar_1$ is a substituted or unsubstituted phenylene group and $Ar_2$ is a substituted or unsubstituted phenyl group.

In the polysilane and dihalosilane of this invention in which X is a group of the general formula (2), it is preferable that $R_2$ is a substituted or unsubstituted phenyl group, $Ar_1$ is a substituted or unsubstituted phenylene group, and $Ar_2$ is a group represented by the general formula (3) in which $Ar_3$ is a substituted or unsubstituted phenylene or biphenylene group and each of $R_3$ and $R_4$ is independently a substituted or unsubstituted phenyl group.

In the polysilane and dihalosilane of this invention in which X is a group of the general formula (2), it is preferable that $R_2$ is a substituted or unsubstituted phenyl group, $Ar_1$ is a substituted or unsubstituted phenylene group, $Ar_2$ is a group represented by the general formula (4) in which $Ar_4$ is a substituted or unsubstituted phenylene group and $Ar_5$ is a substituted or unsubstituted phenyl group.

In the repeating unit represented by the general formula (1) for the polysilane compound of this invention and the dihalosilane represented by the general formula (7) of this invention, it is also preferable that when X is an oxygen or sulfur atom, $Ar_1$ is a substituted or unsubstituted phenylene group and $Ar_2$ is a substituted or unsubstituted phenyl group.

When the ratio of the number of the repeating units (1) to and the ratio of the repeating units (5) to the total number of the repeating units (1) and the repeating units (5) are indicated as z and 1−z, respectively, z is in the range of $0.2 \leq z \leq 1$, preferably $0.5 \leq z \leq 1$ and particularly preferably z=1. When z is less than 0.2, the effects of the side chain group, $Ar_2$—X—$Ar_1$— of the repeating unit (1) become small and no enhancement of hole drift mobility is found, so that said value of z is not desirable.

In the polysilane of this invention, assuming that the average number of the repeating units in one molecule is indicated as k satisfying the following equation:

$$\frac{\sum_{i=1}^{k} i \cdot f_i}{\sum_{i=1}^{\infty} i \cdot f_i} \times 100 = 50(\%) \quad (1)$$

wherein i is the number of the repeating units in one molecule and $f_i$ is the frequency of a molecule having i repeating units (k being referred to hereinafter as $DP_{50}$ in some cases), k is at least 15, preferably at least 70, more preferably at least 100 and most preferably at least 500. When k is less than 15, the segment in which Si atoms are bonded in the planar zigzag structure and which becomes the hopping site cannot exist stably, so that no enhancement of hole drift mobility is found. Therefore, said k value is not desirable. Said k value is neither desirable because the moldability which is the feature of a higher polymeric material is remarkably deteriorated.

The above-mentioned polysilane of this invention has a hole drift mobility of $3 \times 10^{-4}$ to $1 \times 10^{-1}$ cm$^2$/V/sec. The polysilane of this invention in which X is a group represented by the general formula (2) and k is 70 or more is preferred because a higher level of the hole drift mobility of $3 \times 10^{-4}$ to $1 \times 10^{-1}$ cm$^2$/V/sec, more preferably of $5 \times 10^{-4}$ to $1 \times 10^{-1}$ cm$^2$/V/sec and the most preferably of $1 \times 10^{-3}$ to $1 \times 10^{-1}$ cm$^2$/V/sec which has never been seen in the prior art can be achieved.

The polysilane of this invention is obtained by contacting the dihalosilane of this invention represented by the general formula (7) or a mixture of the dihalosilane of this invention represented by the general formula (7) and the dihalosilane represented by the general formula (8) with an alkali metal in an inert solvent under an inert atmosphere of a high purity freed from oxygen and water, for example, a high purity argon gas atmosphere to polycondense the same.

As the method for contacting the above dihalosilane or dihalosilane mixture with an alkali metal in an inert solvent to polycondense the dihalosilane or dihalosilane mixture, there can be used either a method of adding a solution of the dihalosilane or dihalosilane mixture in the inert solvent into a suspension prepared by dispersing the alkali metal in the inert solvent to polycondense the dihalosilane or dihalosilane mixture or a method of adding the said alkali metal suspension into the solution of the dihalosilane or dihalosilane mixture in the inert solvent to polycondense the dihalosilane or dihalosilane mixture. However, in order to synthesize a higher molecular weight polysilane having a high hole drift mobility, there is preferred the method of adding the suspension of the alkali metal into the solution of the dihalosilane or dihalosilane mixture in the inert solvent to polycondense the dihalosilane or dihalosilane mixture.

By adding the said alkali metal suspension into the solution of the dihalosilane or dihalosilane mixture in the inert solvent to polycondense the dihalosilane or dihalosilane mixture, the production of lower molecular weight components can be inhibited whereby a higher molecular weight polysilane can be obtained.

Here, as the halogen atom of the dihalosilane of this invention, in addition to chlorine atom which is most generally used, bromine atom and iodine atom can also be used.

The alkali metal which is used in this invention includes lithium, sodium, potassium and alloys of them. These alkali metals are preferably used in the form of a dispersion of fine particles, more preferably fine particles having an average particle diameter of not more than 100 $\mu$m and most preferably fine particles having an average particle diameter of not more than 50 $\mu$m.

By using the alkali metal in the form of a dispersion of fine particles, preferably fine particles having an average particle diameter of not more than 100 $\mu$m, there can be obtained a higher molecular weight polysilane having a sterically large side chain.

The method of dispersing the alkali metal in the form of fine particles or preferably fine particles having an average particle size of not more than 100 $\mu$m is not critical and includes a method comprising melting the alkali metal in an inert solvent and then mechanically stirring the same; a method comprising melting the alkali metal in an inert solvent and then irradiating an ultrasonic wave thereto; and the like. In order to disperse the alkali metal in the form of fine particles having an average particle diameter of not more than 100 $\mu$m, it is preferable to melt the alkali metal in an inert solvent and irradiating an ultrasonic wave thereto.

The solvent may be any solvent as far as it can dissolve the dihalosilane and is inert to the alkali metal and the dihalosilane, and there can be used, for example, aromatic hydrocarbons such as toluene, xylene, benzene and the like; aliphatic hydrocarbons such as dodecane, heptane, hexane, cyclohexane and the like; ether solvents such as diethyl ether, tetrahydrofuran, tetrahydropyran, diethylene glycol dimethyl ether, dioxane and the like.

The condensation reaction can be carried out at a temperature between room temperature and the boiling point of the solvent, or at a temperature between room temperature and 100° C. where the boiling point of the solvent is above 100° C. The reaction time is not critical and may be 15 minutes to 100 hours.

The dihalosilanes of this invention which have various substituents and are applicable to the Kipping method can be synthesized based on a known synthesis method. That is to say, they can be obtained by a metathesis using an alkyl trichlorosilane or tetrachlorosilane commercially produced by a so-called direct method and a Grignard reagent or an organolithium of an organic compound or by hydrosilylation reaction of hydrosilane with an olefin or acetylene compound.

The polysilane of this invention has a higher hole drift mobility and a higher molecular weight and is excellent in moldability. The polysilane of this invention having excellent characteristics as mentioned above can be obtained by the production process of this invention using the dihalosilane of this invention as the starting material.

DESCRIPTION OF THE PREFERRED EMBODIMENTS

Examples are shown below to explain this invention in more detail; however, this invention should not be construed to be limited to the Examples.

The molecular weight of the polymer was measured using a gel permeation chromatography (Waters Company, Maxima-820, column: Ultrastyragel Linear, mobile phase: tetrahydrofuran) (referred to hereinafter as GPC in some cases). The structure analysis was conducted using $^1$H-NMR and $^{13}$C-NMR (Bruker Company, Model AC200P).

The hole drift mobility can be measured by a known method, for example, the Standard Time-of-Flight method [see F. K. Dolezalek, Photoconductivity and Related Phenomena, Eds. J. Mort & D. M. Pai (New York) Chap. 2 (1976), p. 27].

The ionization potential was determined by the following equation from the oxidization potential (Eox) measured:

Ip (eV)=Eox+Ag/AgCl reference electrode potential (0.196)+ Normal hydrogen electrode potential (4.5)

The oxidation potential was determined from the half-wave potential of voltammogram by a cyclic voltammetry (automatic evaluation system manufactured by Toho Technical Research Co., Ltd., POTENTIOSTAT/GALVANOSTAT 2,000, FUNCTION GENERATOR FG-02; Working electrode, opposing electrode: platinum; reference electrode: Ag/AgCl electrode; sweeping rate: 50 mV/sec) of a dichloromethane solution of 0.1 mmol of a test material (supporting electrolyte: 0.1 mol tetra-n-butylammonium tetrafluoroborate).

EXAMPLE 1

Synthesis of methyl(4-(N,N-diphenylamino)phenyl)dichlorosilane

Unless otherwise specified, the reaction was conducted under a dried argon atmosphere based on usually called Schlenk's method.

The necessary glass-wares were dried at 200° C. and assembled while hot to prepare a reactor. A rubber septum and a gas-introducing tube were equipped on the reactor. In a two-necked 100-ml flask which had been filled with dried argon by cooling while repeating evacuation and filling with dried argon was placed 4.7 g of 4-(N,N-diphenylamino)bromobenzene and melted and dried in vacuo. Thereto was added by use of a gas tight syringe 20 ml of dried tetrahydrofuran distilled on metallic sodium/benzophenone just before the addition to dissolve the 4-(N,N-diphenylamino)bromobenzene in the tetrahydrofuran, after which 9.4 ml of n-butyllithium (manufactured by Aldrich Company, 1.6M hexane solution) was added into the solution at –78° C. and the resulting mixture was subjected to reaction for one hour, to produce 4-(N,N-diphenylamino)phenyllithium.

In a two-necked 100-ml flask dried in the same manner were placed 3.8 g of methyltrichlorosilane (LS-40 manufactured by Shin-Etsu Chemical Co., Ltd.) distilled on calcium hydride just before the feeding and 10 ml of dried tetrahydrofuran, and the resulting mixture was cooled to –78° C. after which the above-mentioned 4-(N,N- diphenylamino)phenyllithium was added thereinto by use of a Teflon cannula. After the addition was complete, the resulting mixture was subjected to reaction for one hour at −78° C. and stirred overnight at room temperature, and then, the excessive methyltrichlorosilane and the solvent were removed by distillation, and the residue was subjected to vacuum distillation (220° C./0.3 mm Hg) by use of Kugelrohr, to obtain 2.1 g (yield: 45%) of a colorless, transparent, viscous liquid. From the results of nuclear magnetic resonance absorption spectrum (NMR) and mass spectrum (GC-MS), it was confirmed that this liquid was methyl(4-(N,N-diphenylamino)phenyl)dichlorosilane.

Structure analysis data (NMR)
$^1$H-NMR
0.85 ppm (1 line: 3H) $\underline{C}H_3$—Si
6.9–7.4 ppm (11 lines: 14H) $(\underline{C}_6\underline{H}_5)N(\underline{C}_6\underline{H}_4)$—Si
(Dioxane 3.57 ppm standard)
$^{13}$C-NMR
5.7 ppm (1 line) $\underline{C}H_3$—Si
121–151 ppm (8 lines) $(\underline{C}_6\underline{H}_5)_2N(\underline{C}_6\underline{H}_4)$—Si
(Chloroform-d 77.1 ppm standard)
Structure analysis data (GC-MS)
GC-MS m/e:M$^+$ (peak intensity) 349 (1) 334 (0.4) 245 (0.3) 167 (0.5)
Measured after conversion to Me(MeO)$_2$Si(C$_6$H$_4$)N(C$_6$H$_5$)$_2$.

EXAMPLE 2

Synthesis of poly(methyl(4-(N,N-diphenylamino)phenyl)silane)

In a three-necked 50-ml flask dried in the same manner as in Example 1 was placed 0.6 g of metallic sodium cut under a dried nitrogen atmosphere in a glove-box and thereto was added 10 ml of toluene dried on metallic sodium and distilled just before the addition. This flask was set in an ultrasonic disperser (Model 450 manufactured by Branson Company) under a dried argon stream, and irradiated with an ultrasonic wave while heated at 98°–105° C. to disperse the metallic sodium in the form of particles having an average diameter of 50 μm, thereby forming a metallic sodium suspension.

On the above metallic sodium suspension-containing flask was equipped a magnetic stirrer, a thermocouple and a rubber septum, and the temperature was elevated to 62° C. by an oil-bath. Simultaneously with the stabilization of the internal temperature of the flask, into the flask was added dropwise over about 10 minutes 9 ml of a solution in dried toluene of 2.1 g of methyl(4-(N,N-diphenylamino)phenyl) dichlorosilane synthesized in the same manner as in Example 1 and distilled just before the dropwise addition. During the addition, the internal temperature of the flask rose temporarily to 90° C. by the heat of reaction. Simultaneously with completion of the addition, the temperature of the flask was elevated to 85° C., at which the reaction was further carried out for additional 10 hours.

After completion of the reaction, toluene and isopropyl alcohol were added to the flask under an argon stream to deactivate the excessive metallic sodium, and then distilled water was further added to dissolve a violet precipitate. The toluene phase was separated and then dried over anhydrous magnesium sulfate, after which the solvent was removed by distillation to obtain 1.65 g of a transparent, resinous material. The resinous material thus obtained was dissolved in tetrahydrofuran and reprecipitated from isopropyl alcohol, and this operation was repeated to obtain 0.25 g of a purified polymer.

The molecular weight distribution of the polymer obtained was measured by GPC and it was as a result confirmed that a higher molecular weight polysilane was obtained. The results of NMR and elementary analysis corresponded to poly(methyl(4-(N,N-diphenylamino) phenyl)silane).

Structural analysis data
$^1$H-NMR
−0.8–0.8 ppm (3H) $\underline{C}H_3$—Si
6.9–7.4 ppm (14H) $(\underline{C}_6\underline{H}_5)_2N(\underline{C}_6\underline{H}_4)$—Si
Integral ratio aromatic/CH$_3$=13.7/3.0
(Dioxane 3.57 ppm standard)
Elementary analysis (% by weight)

|  | Si | C | H | N |
| --- | --- | --- | --- | --- |
| Found value | 8.7 | 79.0 | 6.0 | 4.8 |
| Expected value | 9.8 | 79.0 | 6.0 | 5.0 |

Molecular weight
Mw=1.7×10$^6$, Mn=9.2×10$^3$
Mw/Mn=185
DP$_{50}$=2,200
Yield 13% (0.25 g)

In 1.9 g of dried toluene was dissolved 0.1 g of the polysilane synthesized as mentioned above to form a 5% by weight toluene solution of polysilane. This toluene solution was filtered through a membrane filter of 0.2 μm to prepare a coating solution. Onto a slide glass substrate with a transparent conductive film (ITO), amorphous selenium as a charge-generating layer was deposited in a film thickness of 0.2 μm by a vacuum evaporation method, on which layer the above coating solution was coated in a film thickness of 4.7 μm by a spin coater to form a polysilane hole transporting layer. Further, a gold electrode was formed by a vacuum evaporation method on the polysilane hole transporting layer, and the resulting assembly was used as a sample for measuring the hole drift mobility.

A flush light (wavelength: 481 nm, flush time: 1 nsec) was exposed to this sample from the transparent electrode side using a nitrogen laser-excited dye laser (nitrogen laser/dye laser Model LN1000/LN102 manufactured by Laser Photonics Company), and the hole drift mobility was measured by a conventional time-of-flight method. For measurement of photoinduced current, digitizing oscilloscope (Model 54710A/54713A manufactured by HEWLETT-PACKARD COMPANY) was used. As a result, a hole drift mobility of 1×10$^{-3}$ cm$^2$/V/sec was obtained at room temperature at an applied voltage of 235 V (electric field intensity: 0.5 MV/cm).

EXAMPLE 3

Synthesis of ethyl(4-(N,N-diphenylamino)phenyl)dichlorosilane

In a three-necked 50-ml flask dried in the same manner as in Example 1 was placed 5.0 g of 4-(N,N-diphenylamino) bromobenzene and melted and dried under vacuum. Thereto was added 14 ml of a dried tetrahydrofuran distilled on metallic sodium/benzophenone just before the addition by use of a gas tight syringe to dissolve the 4-(N,N-diphenylamino)bromobenzene therein, after which 9.6 ml of n-butyllithium (manufactured by Aldrich Company, 1.6M hexane solution) was added dropwise thereinto at −78° C. The resulting mixture was subjected to reaction for 2.5 hours to produce 4-(N,N-diphenylamino)phenyllithium.

In a two-necked 100-ml flask dried in the same manner were placed 3.4 g of ethyltrichlorosilane (LS-120 manufactured by Shin-Etsu Chemical Co., Ltd.) distilled on calcium hydride just before the addition and 15 ml of dried tetrahydrofuran, and the flask was cooled to −78° C., and the above-mentioned 4-(N,N-diphenylamino)phenyllithium was then added dropwise thereinto by use of a Teflon cannula. After the addition was complete, the resulting mixture was subjected to reaction for one hour at −78° C. and stirred overnight at room temperature, and thereafter, the excessive ethyltrichlorosilane and the solvent were removed by distillation, and the residue was then subjected to distillation under reduced pressure (210° C./0.3 mm Hg) by use of Kugelrohr to obtain 2.8 g (yield: 50%) of a colorless, transparent, viscous liquid. From the results of NMR, it was confirmed that this liquid was ethyl(4-(N,N-diphenylamino)phenyl)dichlorosilane.

Structure analysis data
$^1$H-NMR
0.97–1.06 ppm (3H) $\underline{CH_3}CH_2$—Si
1.12–1.25 ppm (2H) $CH_3\underline{CH_2}$—Si
6.90–7.40 ppm (12 lines: 14H) $(\underline{C_6H_5})_2N(\underline{C_6H_4})$—Si
(Dioxane 3.57 ppm standard)
$^{13}$C-NMR
6.4 ppm $\underline{CH_3}CH_2$—Si
13.3 ppm $CH_3\underline{CH_2}$—Si
121–151 ppm (8 lines) $(\underline{C_6H_5})_2N(\underline{C_6H_4})$—Si
(Chloroform-d 77.1 ppm standard)

EXAMPLE 4

Synthesis of poly(ethyl(4-(N,N-diphenylamino)phenyl)silane)

In a three-necked 50-ml flask dried by the same operation as in Example 1 were placed 0.7 g of metallic sodium cut under a dried nitrogen atmosphere in a glove-box and 16 ml of dried toluene. This flask was set in an ultrasonic disperser and the metallic sodium was dispersed at 100°–105° C. in the form of particles having an average particle diameter of 30 μm. After the dispersion was formed, the flask was allowed to stand and 12 ml of the excessive toluene of the supernatant liquid was removed by a syringe to form a metallic sodium suspension.

A three-necked 50-ml flask dried in the same manner were equipped with a magnetic stirrer, a thermocouple and a rubber septum, and therein were placed 4.9 g of ethyl(4-(N,N-diphenylamino)phenyl)dichlorosilane synthesized in the same manner as in Example 3 and 4 ml of dried toluene to prepare a solution. The temperature of this flask was elevated to 80° C., and thereafter, the above metallic sodium suspension was added dropwise thereto over about 10 minutes by use of a Teflon cannula. During the addition, the internal temperature of the flask rose temporarily to 120° C. by the heat of reaction. After the completion of addition, the reaction was carried out for four hours at 80° C. After the reaction was complete, toluene and isoprene were added thereto to terminate the reaction and simultaneously deactivate the excessive metallic sodium.

The precipitate formed was separated by a centrifugal operation and washed twice with toluene to recover solubles in the form of a toluene solution. The toluene solution was washed with water and then dried over anhydrous sodium sulfate, after which the solvent was removed by distillation to obtain a resinous material. This resinous material was dissolved in tetrahydrofuran and then the resulting solution was repeatedly subjected to reprecipitation from isopropyl alcohol, to obtain 0.24 g of a purified polymer.

As a result of the measurement of molecular weight distribution of the polymer obtained by GPC, it was confirmed that a higher molecular weight polysilane was obtained. The results of NMR and elementary analysis corresponded to poly(ethyl(4-(N,N-diphenylamino)phenyl)silane).

Structure analysis data
$^1$H-NMR
−0.6–0.6 ppm (5H) $\underline{C_2H_5}$—Si
6.6–7.2 ppm (14H) $(\underline{C_6H_5})_2N(\underline{C_6H_4})$—Si
Integral ratio aromatic/$C_2H_5$=14.1/5.0
(Dioxane 3.57 ppm standard)
Elementary analysis (% by weight)

|  | Si | C | H | N |
|---|---|---|---|---|
| Found value | 8.2 | 80.0 | 6.4 | 4.7 |
| Expected value | 9.3 | 79.7 | 6.4 | 4.6 |

Molecular weight
Mw=$1.1 \times 10^6$, Mn=$7.3 \times 10^3$
Mw/Mn=151
DP$_{50}$=1,800
Yield 6% (0.24 g)

Using the polysilane synthesized above, a sample having a film thickness of 5.8 μm for measuring the hole drift mobility was prepared in the same manner as in Example 2. By the same method as in Example 2, a hole drift mobility of $3 \times 10^{-3}$ cm$^2$/V/sec was obtained at room temperature at an applied voltage of 290 V (electric field intensity: 0.5 MV/cm).

EXAMPLE 5

Synthesis of ethyl(4-(N-(4'-methylphenyl)-N-phenylamino)phenyl)dichlorosilane

In a three-necked 50-ml flask dried by the same operation as in Example 1 was placed 4.8 g of 4-(N-(4'-methylphenyl)-N-phenylamino)bromobenzene and melted and dried under vacuum. Thereto was added 14 ml of dried tetrahydrofuran distilled on metallic sodium just before the addition by use of a gas tight syringe to dissolve 4-(N-(4'-methylphenyl)-N-phenylamino)bromobenzene, after which 9.7 ml of n-butyllithium (manufactured by Aldrich Company, 1.6M hexane solution) was added thereto at −78° C., and the resulting mixture was subjected to reaction for 2.5 hours, to produce 4-(N-(4'-methylphenyl)-N-phenylamino)phenyllithium.

In a two-necked 100-ml flask dried in the same manner were placed 3.4 g of ethyltrichlorosilane (LS-120 manufactured by Shin-Etsu Chemical Co., Ltd.) distilled on calcium hydride just before the addition and 14 ml of tetrahydrofuran, after which the resulting mixture was cooled to −78° C. Thereafter, the above 4-(N-(4'-methylphenyl)-N-phenylamino)phenyllithium was added dropwise thereinto by use of a Teflon cannula. After the addition was complete, the resulting mixture was subjected to reaction for one hour at −78° C. and stirred overnight at room temperature and then the excessive ethyltrichlorosilane and the solvent were removed by distillation, after which the residue was subjected to distillation under reduced pressure (220° C./0.15 mm Hg) to obtain 2.8 g (yield: 51%) of a pale yellow, transparent, viscous liquid. From the results of nuclear magnetic resonance absorption spectrum (NMR), it was confirmed that this liquid was ethyl(4-(N-(4'-methylphenyl)-N-phenylamino)phenyl)dichlorosilane.

Structure analysis data
$^1$H-NMR
0.9–1.3 ppm (5H) $\underline{C_2H_5}$—Si 2.2 ppm (1 line: 3H) (C̲H̲$_3$—C$_6$H$_4$)—N 6.7–7.5 ppm (13H)(CH$_3$—C̲$_6$H̲$_4$) (C̲$_6$H̲$_5$)N(C̲$_6$H̲$_4$)—Si
(Dioxane 3.57 ppm standard)

$^{13}$C-NMR

6–14 ppm (2 lines) C̲$_2$H̲$_5$—Si 21 ppm (1 line) (C̲H̲$_3$—C$_6$H$_4$)—N

120–150 ppm (12 lines) (CH$_3$—C̲$_6$H̲$_4$) (C̲$_6$H̲$_5$)N(C̲$_6$H̲$_4$)-Si
(Chloroform-d 77.1 ppm standard)

EXAMPLE 6

Synthesis of poly(ethyl(4-(N-(4'-methylphenyl)-N-phenylamino)phenyl)silane)

Reaction and purification were conducted in the same manner as in Example 4, except that 2.75 g of the ethyl(4-(N-(4'-methylphenyl)-N-phenylamino)phenyl)dichlorosilane synthesized in Example 5 and distilled just before use was substituted for the ethyl(4-(N,N-diphenylamino)phenyl)dichlorosilane used in Example 4, to obtain 0.13 g of a purified polymer. As a result of measuring the molecular weight distribution of the polymer obtained by GPC, it was confirmed that a high molecular weight polysilane compound was obtained. The results of NMR and elementary analysis corresponded to poly(ethyl(4-(N-(4'-methylphenyl)-N-phenylamino)phenyl)silane).

Structure analysis data $^1$H-NMR

−0.2–1.6 ppm (5H) C̲$_2$H̲$_5$—Si 1.8–2.4 ppm (3H) (C̲H̲$_3$—C$_6$H$_4$)—N 6.0–7.8 ppm (13H) (CH$_3$—C̲$_6$H̲$_4$) (C̲$_6$H̲$_5$)N(C̲$_6$H̲$_4$)—Si Integral ratio aromatic/CH$_3$/C$_2$H$_5$=14.2/3.2/5.0

(Dioxane 3.57 ppm standard)

Elementary analysis (% by weight)

|  | Si | C | H | N |
|---|---|---|---|---|
| Found value | 8.9 | 77.6 | 6.7 | 4.2 |
| Expected value | 8.9 | 79.9 | 6.7 | 4.4 |

Molecular weight

Mw=1.7×10$^6$, Mn=2.5×10$^4$

Mw/Mn=68

DP$_{50}$=3,200

Yield 6% (0.13 g)

In the same manner as in Example 2, a sample having a film thickness of 7.9 μm for measuring the hole drift mobility was prepared using the polysilane synthesized above. By the same method as in Example 2, a hole drift mobility of 5×10$^{-3}$ cm$^2$/V/sec was obtained at room temperature at an applied voltage of 395 V (electric field intensity: 0.5 MV/cm).

EXAMPLE 7

Synthesis of ethyl(4-(N,N-bis(4'-methylphenyl)amino)phenyl)dichlorosilane

In a three-necked 50-ml flask dried by the same operation as in Example 1 was placed 5.0 g of 4-(N,N-bis(4'-methylphenyl)amino)bromobenzene and melted and dried under vacuum. Thereto was added 14 ml of dried tetrahydrofuran distilled on metallic sodium/benzophenone just before the addition by use of a gas tight syringe to dissolve the 4-(N,N-bis(4'-methylphenyl)amino)bromobenzene, and thereafter, 9.6 ml of n-butyllithium (manufactured by Aldrich Company, 1.6M hexane solution) was dropped into the solution at −78° C., after which the resulting mixture was subjected to reaction for 2.5 hours, to produce 4-(N,N-bis(4'-methylphenyl)amino)phenyllithium.

In a two-necked 100-ml flask dried in the same manner were placed 3.3 g of ethyltrichlorosilane (LS-120 manufactured by Shin-Etsu Chemical Co., Ltd.) distilled on calcium hydride just before the addition and 14 ml of dried tetrahydrofuran, and the resulting mixture was cooled to −78° C., after which the above 4-(N,N-bis(4'-methylphenyl)amino)phenyllithium was added dropwise thereinto by use of a Teflon cannula. After the dropwise addition was complete, the resulting mixture was subjected to reaction for one hour at −78° C. and stirred overnight at room temperature, and thereafter, the excessive ethyltrichlorosilane and the solvent were removed by distillation, after which the residue was distilled under reduced pressure (230° C./0.15 mm Hg) using Kugelrohr to obtain 3.3 g (yield: 57%) of a pale yellow, transparent, viscous liquid. From the results of NMR, it was confirmed that this liquid was ethyl(4-(N,N-bis(4'-methylphenyl)amino)phenyl)dichlorosilane.

Structure analysis data $^1$H-NMR 0.9–1.3 ppm (5H) C̲$_2$H̲$_5$—Si 2.2 ppm (1 line: 6H) (C̲H̲$_3$—C$_6$H$_4$)$_2$—N 6.7–7.5 ppm (12H) (CH$_3$—C̲$_6$H̲$_4$)$_2$N(C̲$_6$H̲$_4$)—Si
(Dioxane 3.57 ppm standard)

$^{13}$C-NMR

6–14 ppm (2 lines) C̲$_2$H̲$_5$—Si 21 ppm (1 line) (C̲H̲$_3$—C$_6$H$_4$)$_2$—N

119–152 ppm (8 lines) (CH$_3$—C̲$_6$H̲$_4$)$_2$N(C̲$_6$H̲$_4$)—Si
(Chloroform-d 77.1 ppm standard)

EXAMPLE 8

Synthesis of polyethyl(4-(N,N-bis(4'-methylphenyl)amino)phenyl)silane

Reaction and purification were conducted in the same manner as in Example 4, except that 3.26 g of ethyl(4-(N,N-bis(4'-methylphenyl)amino)phenyl)dichlorosilane synthesized in Example 7 was substituted for the ethyl(4-(N,N-diphenylamino)phenyl)dichlorosilane used in Example 4, to obtain 0.18 g of a purified polymer.

As a result of the measurement of the molecular weight distribution of the polymer obtained using GPC, it was confirmed that a higher molecular weight polysilane was obtained. The results of NMR and elementary analysis corresponded to poly(ethyl(4-(N,N-bis(4'-methylphenyl)amino)phenyl)silane).

Structure analysis data $^1$H-NMR

−0.2–1.6 ppm (5H) C̲$_2$H̲$_5$—Si 1.8–2.6 ppm (6H) (C̲H̲$_3$C$_6$H$_4$)$_2$—N 6.0–7.8 ppm (12H) (CH$_3$—C̲$_6$H̲$_4$)$_2$N(C̲$_6$H̲$_4$)—Si Integral ratio aromatic/CH$_3$/C$_2$H$_5$=13.3/6.4/5.0

(Dioxane 3.57 ppm standard)

Elementary analysis (% by weight)

|  | Si | C | H | N |
|---|---|---|---|---|
| Found value | 8.5 | 78.8 | 7.0 | 4.2 |
| Expected value | 8.5 | 80.2 | 7.0 | 4.3 |

Molecular weight

Mw=1.6×10$^6$, Mn=1.2×10$^4$

Mw/Mn=133

DP$_{50}$=2,600

Yield 7% (0.18 g)

In the same manner as in Example 2, a sample having a film thickness of 5.4 μm for measuring the hole drift mobility was prepared using the polysilane synthesized above. By the same method as in Example 2, a hole drift mobility of $5 \times 10^{-3}$ cm$^2$/V/sec was obtained at room temperature at an applied voltage of 270 V (electric field intensity: 0.5 MV/cm).

Comparative Example 1

Synthesis of poly(methylphenylsilane)

In a three-necked 100-ml flask dried in the same manner as in Example 1 was placed 1.3 g of metallic sodium and then 19 ml of dried toluene was added thereto. This flask was subjected to irradiation with an ultrasonic wave under a dried argon stream to disperse the metallic sodium in the form of particles having an average particle diameter of 50 μm, and the temperature was elevated to 62° C., after which 5.0 g of methylphenyldichlorosilane (LS-1490 manufactured by Shin-Etsu Chemical Co., Ltd.) distilled just before use was added dropwise into the flask over about 20 minutes by use of a gas tight syringe. During the dropwise addition, the internal temperature of the flask rose temporarily to 110° C. by the heat of reaction and reflux of solvent was observed.

Upon completion of the dropwise addition, the temperature of the flask was elevated to 85° C. and the reaction was carried out for additional 40 minutes. After completion of the reaction, 20 ml of toluene and 3 ml of isopropyl alcohol were added to the flask under an argon stream to deactivate the excessive metallic sodium. The precipitate formed was separated by centrifugal operation and washed two times with toluene to recover solubles in the form of a toluene solution. The toluene solution was washed with water and then dried over anhydrous magnesium sulfate, after which the solvent was removed by distillation to obtain a transparent, resinous material.

The resinous material obtained was dissolved in tetrahydrofuran and reprecipitated from isopropyl alcohol, and this operation was repeated to obtain 0.8 g of a purified polymer.

As a result of the measurement of the molecular weight distribution of the polymer obtained by GPC, it was confirmed that a higher molecular weight polysilane was obtained. The results of NMR and elementary analysis corresponded to poly(methylphenylsilane).

Structure analysis data $^1$H-NMR

−1.2–0.3 ppm (3H) $\underline{CH_3}$—Si 6.0–7.4 ppm (5H) $\underline{C_6H_5}$—Si Integral ratio aromatic/CH$_3$=5.0/3.0

(Dioxane 3.57 ppm standard)

Elementary analysis (% by weight)

|  | Si | C | H | N |
| --- | --- | --- | --- | --- |
| Found value | 22.0 | 69.0 | 6.9 | <0.3 |
| Expected value | 23.0 | 70.0 | 6.7 | 0 |

Molecular weight

Mw=$2.3 \times 10^5$, Mn=$6.2 \times 10^3$

Mw/Mn=37

DP$_{50}$=80

Yield 24% (0.8 g)

In the same manner as in Example 2, a sample having a film thickness of 4.0 μm for measuring the hole drift mobility using the polysilane synthesized above. By the same method as in Example 2, a hole drift mobility of $2 \times 10^{-4}$ cm$^2$/V/sec was obtained at room temperature at an applied voltage of 200 V (electric field intensity: 0.5 MV/cm).

Comparative Example 2

In 50 ml of tetrahydrofuran was dissolved 0.5 g of the polysilane compound obtained in Comparative Example 1, and into the solution was added dropwise 100 ml of isopropyl alcohol. The precipitate formed was separated by filtration and dried to obtain 0.10 g of a polymer consisting of only a higher molecular weight component.

Molecular weight

Mw=$9.8 \times 10^5$, Mn=$1.5 \times 10^4$.

Mw/Mn=65

DP$_{50}$=1,800

In the same manner as in Example 2, a sample having a film thickness of 1.3 μm for measuring the hole drift mobility was prepared using the above polysilane. By the same method as in Example 2, a hole drift mobility of $2 \times 10^{-4}$ cm$^2$/V/sec was obtained at room temperature at an applied voltage of 65 V (electric field intensity: 0.5 MV/cm).

Comparative Example 3

The filtrate obtained by removing the precipitate by filtration in Comparative Example 2 was further subjected to reprecipitation operation to obtain 0.20 g of a polymer consisting of only a lower molecular weight component.

Molecular weight

Mw=$1.5 \times 10^4$, Mn=$4.2 \times 10^3$

Mw/Mn=3.6

DP$_{50}$=50

In the same manner as in Example 2, a sample having a film thickness of 4.3 μm for measuring the hole drift mobility was prepared using the above polysilane. By the same method as in Example 2, a hole drift mobility of $3 \times 10^{-5}$ cm$^2$/V/sec was obtained at room temperature at an applied voltage of 215 V (electric field intensity: 0.5 MV/cm).

Comparative Example 4

Functionarization of polymethylphenylsilane with triphenylamine

A three-necked 50-ml flask dried by the same operation as in Example 1 was equipped with a Dimroth condenser, a magnetic stirrer, a gas-introducing tube and a rubber septum, and 1.0 g of a poly(methylphenylsilane) (Mw=$2.8 \times 10^4$, Mn=$9.2 \times 10^3$) synthesized as above under a dried argon stream was charged into the flask and vacuum-dried. To the flask was added 15 ml of chloroform distilled on calcium hydride just before the addition to dissolve the poly (methylphenylsilane), after which the solution was cooled to −25° C. in a dry ice/carbon tetrachloride bath, and, with stirring, 0.1 g of trifluoromethanesulfonic acid was slowly added. After completion of the dropwise addition, the reaction mixture was stirred for 0.5 hour at room temperature. After the reaction was complete, the solvent was removed by distillation and 5 ml of dried benzene was added to dissolve the solids. This operation was repeated twice to obtain a benzene solution of a polysilane substituted by a triflate group (trifluoromethylsulfonate group). From the analysis by NMR, it was found that 15% of the phenyl group of the poly(methylphenylsilane) had been replaced by the triflate group.

In a three necked 25-ml flask dried in the same manner were equipped with a Dimroth condenser, a magnetic stirrer, a gas-introducing tube and a rubber septum, into which flask 0.94 g (purity: 93%) of 4-(N,N-diphenylamino) bromobenzene was charged under a dried argon stream, and melted and dried under vacuum. To the flask was added 20 ml of tetrahydrofuran distilled on sodium/benzophenone just before the addition to dissolve the 4-(N,N-diphenylamino) bromobenzene, and then, cooled to −78° C., after which 1.5 ml of a n-butyllithium solution in hexane (1.6M) was added dropwise thereinto by use of a gas tight syringe, and the resulting mixture was subjected to reaction for one hour to produce 4-(N,N-diphenylamino)phenyllithium. Into this flask a benzene solution of the previously prepared triflate-substituted polysilane was slowly added by use of a gas tight syringe, and the resulting mixture was subjected to reaction at −78° C. for one hour and then at room temperature for additional two hours.

After the reaction was complete, a small amount of ethanol was added to deactivate the excessive 4-(N,N-diphenylamino)phenyllithium and thereafter the solvent was removed by distillation to obtain a pale yellow solid. This resinous solid was dissolved in 10 ml of tetrahydrofuran and thereafter the resulting solution was slowly added into 100 ml of ethanol to conduct reprecipitation and purification. The precipitated polymer was separated by filtration, washed with water and then dried to obtain 0.76 g of poly(methylphenylsilane) having triphenylamine as a side chain substituent.

From the results of the structure analysis of the polysilane obtained by NMR and composition analysis, it was confirmed that 13% of the side chain phenyl group of the poly(methylphenylsilane) had been replaced by triphenylamine. The results of measurement of molecular weight showed that the weight averaged molecular weight was $1.7 \times 10^4$ and the number averaged molecular weight was $8.5 \times 10^3$ (yield: 63%), and that the triflate group was not able to be completely substituted and, in addition, the molecular weight was reduced.

In the same manner as in Example 2, a sample having a film thickness of 5.5 μm for measuring the hole drift mobility was prepared using the polysilane synthesized above. By the same method as in Example 2, a hole drift mobility of $3 \times 10^{-5}$ cm$^2$/V/sec was obtained at room temperature at an applied voltage of 275 V (electric field strength: 0.5 MV/cm).

The results of Examples 2, 4, 6 and 8 and Comparative Examples 1 to 4 are collectively shown in Table 1.

TABLE 1

| | Repeating unit | Mw | Mn | Mw/Mn | DP$_{50}$ | Hole drift mobility (cm$^2$/V/sec) | Ip of H—Ar$_1$—X—Ar$_2$ (eV) |
|---|---|---|---|---|---|---|---|
| Example 2 | −(Si)− with CH$_3$ and p-(C$_6$H$_4$)-N(C$_6$H$_5$)$_2$ | $1.7 \times 10^6$ | $9.2 \times 10^3$ | 185 | 2200 | $1 \times 10^{-3}$ | 5.79 |
| Example 4 | −(Si)− with C$_2$H$_5$ and p-(C$_6$H$_4$)-N(C$_6$H$_5$)$_2$ | $1.1 \times 10^6$ | $7.3 \times 10^3$ | 151 | 1800 | $3 \times 10^{-3}$ | 5.79 |
| Example 6 | −(Si)− with C$_2$H$_5$ and p-(C$_6$H$_4$)-N(C$_6$H$_5$)(p-C$_6$H$_4$-CH$_3$) | $1.7 \times 10^6$ | $2.5 \times 10^4$ | 68 | 3200 | $5 \times 10^{-3}$ | 5.71 |

TABLE 1-continued

| Repeating unit | Mw | Mn | Mw/Mn | DP$_{50}$ | Hole drift mobility (cm$^2$/V/sec) | Ip of H—Ar$_1$—X—Ar$_2$ (eV) |
|---|---|---|---|---|---|---|
| Example 8: ‑(Si)‑ with C$_2$H$_5$ group, Si bonded to triphenylamine core with three p-tolyl groups (CH$_3$ substituents) | $1.6 \times 10^6$ | $1.2 \times 10^4$ | 133 | 2600 | $5 \times 10^{-3}$ | 5.61 |
| Comparative Example 1: ‑(Si)‑ with CH$_3$ and phenyl | $2.3 \times 10^5$ | $6.2 \times 10^3$ | 37 | 80 | $2 \times 10^{-4}$ | — |
| Comparative Example 2: ‑(Si)‑ with CH$_3$ and phenyl | $9.8 \times 10^5$ | $1.5 \times 10^4$ | 65 | 1800 | $2 \times 10^{-4}$ | — |
| Comparative Example 3: ‑(Si)‑ with CH$_3$ and phenyl | $1.5 \times 10^4$ | $4.2 \times 10^3$ | 3.6 | 50 | $3 \times 10^{-5}$ | — |
| Comparative Example 4: ‑(Si)$_{0.07}$‑(Si)$_{0.09}$‑ copolymer with CH$_3$ groups; second Si bonded to phenyl‑N(phenyl)$_2$ (triphenylamine) | $1.7 \times 10^4$ | $8.5 \times 10^3$ | 2.0 | 92 | $3 \times 10^{-5}$ | 5.79 |

EXAMPLE 9

Synthesis of ethyl(3-(9-phenyl)carbazoyl)dichlorosilane

In a three-necked 100-ml flask dried by the same operation as in Example 1 was placed 5.5 g of 3-bromo(9-phenyl)carbazole and melted and dried under vacuum. Thereto was added 20 ml of dried tetrahydrofuran distilled on metallic sodium/benzophenone just before the addition by use of a gas tight syringe to dissolve the 3-bromo(9-phenyl)carbazole therein, after which 10 ml of n-butyllithium (manufactured by Aldrich Company, 1.6M hexane solution) was added into the solution at −78° C. The resulting mixture was subjected to reaction for one hour to produce 3-lithio(9-phenyl)carbazole.

In a two-necked 100-ml flask dried in the same manner were placed 3.5 g of ethyltrichlorosilane (LS-120 manufactured by Shin-Etsu Chemical Co., Ltd.) distilled on calcium hydride just before the addition and 15 ml of dried tetrahydrofuran, and the resulting mixture was cooled to −78° C., after which the above-mentioned 3-lithio(9-phenyl)carbazole was added dropwise into the mixture by use of a Teflon cannula. After the addition was complete, the mixture was subjected to reaction for one hour, and then, the excessive ethyltrichlorosilane and the solvent were removed by distillation, after which the residue was distilled under reduced pressure (240° C./0.4 mmHg) by use of Kugelrohr to obtain 3.2 g (yield: 51%) of a colorless, transparent, viscous liquid. From the results of NMR and mass spectrum (GC-MS), it was confirmed that this liquid was ethyl(3-(9-phenyl)carbazoyl)dichlorosilane.

Structure analysis data (NMR)

53

¹H-NMR 0.85 ppm (3 lines: 3H) C̲H₃CH₂—Si 1.0 ppm (4 lines: 2H) CH₃C̲H₂—Si 6.9–8.2 ppm (11 lines: 14H) C̲₆H̲₅(C̲₁₂H̲₇N)—Si
(Dioxane 3.57 ppm standard)

¹³C-NMR 5.6 ppm C̲H₃CH₂—Si 13.4 ppm CH₃C̲H₂—Si

120–150 ppm (16 lines) C̲₆H̲₅(C̲₁₂H̲₇N)—Si
(Chloroform-d 77.1 ppm standard)

Structure analysis data (GC-MS)

GC-MS m/e: M⁺ 361

EXAMPLE 10

Synthesis of poly(ethyl(3-(9-phenyl)carbazoyl)silane-co-ethylphenylsilane)

A three-necked 100-ml flask dried by the same operation as in Example 1 was equipped with a rubber septum and a three-way stop cock and therein were placed 0.89 g of metallic sodium cut under a dried nitrogen atmosphere in a glove-box and 15 ml of dried toluene. This flask was set in an ultrasonic disperser and the metallic sodium was dispersed in the form of particles having an average particle diameter of 30 µm at 100°–105° C. After the dispersion was formed, the flask was allowed to stand and 10 ml of the excessive toluene was removed by use of a syringe to form a metallic sodium suspension and thereafter a magnetic stirrer and a thermocouple were equipped on the flask.

The temperature of the flask containing the above metallic sodium suspension was elevated to 70° C., and after the internal temperature of the flask was stabilized, 9.5 ml of a solution in toluene of a mixture of 3.2 g of the ethyl(3-(9-phenyl)carbazoyl)dichlorosilane synthesized in Example 9 and 1.8 g of ethylphenyldichlorosilane was added dropwise into the flask by use of a gas tight syringe over about 10 minutes. During the addition, the internal temperature of the flask rose temporarily to 105° C. by the heat of reaction. After completion of the addition, the resulting mixture was subjected to reaction at 85° C. for eight hours.

After completion of the reaction, 20 ml of toluene and 3 ml of isopropyl alcohol were added to the flask under an argon stream to deactivate the excessive metallic sodium. The resulting precipitate was separated by centrifugal operation and washed twice with toluene to recover solubles in the form of a toluene solution. The toluene solution was washed with water and dried over anhydrous magnesium sulfate, after which the solvent was removed by distillation to obtain 3.8 g of a transparent, resinous material. The resinous material thus obtained was dissolved in tetrahydrofuran and reprecipitated from isopropyl alcohol, and this operation was repeated to obtain 0.27 g of a purified polymer.

As a result of measuring the molecular weight distribution of the polymer obtained by GPC, it was confirmed that a higher molecular weight polysilane was obtained. The results of NMR and elementary analysis corresponded to poly(ethyl(3-(9-phenyl)carbazoyl)silane-co-ethylphenylsilane). From the analysis by NMR, it was found that the content of the ethyl(3-(9-phenyl)carbazoyl)silane structural unit was 30%.

Structure analysis data

¹H-NMR

−0.6–1.0 ppm (5H) C̲₂H̲₅—Si 6.0–7.8 ppm (12H+5H) C̲₆H̲₅—(C̲₁₂H̲₇N)—Si+C̲₆H̲₅—Si

Integral ratio aromatic/C₂H₅=7.0/5.0

(Dioxane 3.57 ppm standard)

54

Elementary analysis (% by weight)

|  | Si | C | H | N |
|---|---|---|---|---|
| Found value | 14.0 | 72.0 | 6.3 | 7.4 |
| Expected value | 15.0 | 72.0 | 6.3 | 7.3 |

Molecular weight

Mw=1.6×10⁶, Mn=8.1×10⁴

Mw/Mn=20

DP₅₀=5,500

Yield 9% (0.27 g)

EXAMPLE 11

Synthesis of ethyl(4-(N-(4'-(2",2"-diphenylethenyl)phenyl)-N-phenylamino)phenyl)dichlorosilane In a three-necked 100-ml flask dried by the same operation as in Example 1 was placed 4.8 g of 4-(N-(4'-(2",2"-diphenylethenyl)phenyl)-N-phenylamino)bromobenzene, and dried under vacuum. Thereto was added 50 ml of dried tetrahydrofuran distilled on metallic sodium/benzophenone just before the addition by use of a gas tight syringe to dissolve the 4-(N-(4'-(2",2"-diphenylethenyl)phenyl)-N-phenylamino)bromobenzene therein, after which 7 ml of n-butyllithium (manufactured by Aldrich Company, 1.6M hexane solution) wad added into the solution at −78° C. The resulting mixture was subjected to reaction for one hour at −78° C. to produce 4-(N-4'-(2",2"-diphenylethenyl)phenyl-N-phenylamino)phenyllithium.

In a three-necked 100-ml flask dried in the same manner were placed 3.35 g of ethyltrichlorosilane (LS-120 manufactured by Shin-Etsu Chemical Co., Ltd.) distilled on calcium hydride just before the addition and 20 ml of dried tetrahydrofuran, and then cooled to −78° C., after which the above-mentioned 4-(N-(4'-(2",2"-diphenylethenyl)phenyl)-N-phenylamino)phenyllithium was added dropwise thereinto by use of a Teflon cannula. After the addition was complete, the resulting mixture was subjected to reaction for one hour at −78° C. and stirred overnight at room temperature and thereafter the excessive ethyltrichlorosilane and the solvent were removed by distillation. The residue was extracted with 30 ml of dried toluene again and then filtered through a G5 glass filter under a dried argon atmosphere to remove the lithium chloride formed. The residue was recrystallized from a 1:3 mixed solvent of toluene and hexane to obtain 3.1 g (yield: 51%) of a pale yellow solid. From the results of NMR, it was confirmed that this solid was ethyl (4-(N-(4'-(2",2"-diphenylethenyl)phenyl)-N-phenylamino) phenyl)dichlorosilane.

Structure analysis data

¹H-NMR 1.1 ppm (3H) C̲H₃CH₂—Si 1.3 ppm (2H) CH₃C̲H₂—Si 6.8–7.5 ppm (24H)[(C̲₆H̲₅)₂C̲=CH(C̲₆H̲₄)](C̲₆H̲₅)N(C̲₆H̲₄)—Si (Tetramethylsilane 0.0 ppm standard)

¹³C-NMR 6.43 ppm (1 line) C̲H₃CH₂—Si 13.2 ppm (1 line) CH₃C̲H₂—Si

121–150 ppm (18 lines)[(C̲₆H̲₅)₂C̲=CH(C̲₆H̲₄)](C̲₆H̲₅)N(C̲₆H̲₄)—Si (Chloroform-d 77.1 ppm standard)

EXAMPLE 12

Synthesis of poly(ethyl(4-(N-(4'-(2",2"-diphenylethenyl) phenyl)-N-phenylamino)phenyl)silane)

In a three-necked 50-ml flask dried in the same manner was placed 0.26 g of metallic sodium cut under a dried nitrogen atmosphere in a glove-box and thereto was added 25 ml of toluene dried on metallic sodium and distilled just before the addition. This flask was set in an ultrasonic disperser under a dried argon atmosphere and irradiated with an ultrasonic wave while heated at 98°–105° C. to disperse the metallic sodium in the form of particles having an average particle diameter of 10 μm, thereby forming a metallic sodium suspension.

The above metallic sodium suspension was transferred to a three-necked 300-ml flask dried in the same manner, by use of a Teflon cannula, and the flask was equipped with a magnetic stirrer, a thermocouple and a rubber septum, after which the temperature of the flask was elevated to 95° C. Simultaneously with the stabilization of the internal temperature of the flask, 20 ml of a solution in dried toluene of 2.8 g of the ethyl(4-(N-(4'-(2",2"-diphenylethenyl)phenyl)-N-phenylamino)phenyl)dichlorosilane synthesized in Example 11 was added dropwise into the flask over about 30 minutes by use of a dropping funnel. After the addition was complete, the reaction mixture was concentrated to 10 ml and the internal temperature of the flask was adjusted to 80° C. Simultaneously with the stabilization of the internal temperature of the flask, 1 ml of tetrahydrofuran was added thereto. During the addition, the internal temperature of the flask rose to 85° C. by the heat of reaction. After completion of the addition, the contents of the flask were subjected to reaction at 80° C. for two hours.

After completion of the reaction, 1 ml of isopropyl alcohol was placed in the flask under an argon atmosphere to deactivate the excessive metallic sodium.

The resulting precipitate was separated by centrifugal operation and washed twice with toluene to recover solubles in the form of a toluene solution. The toluene solution was washed with water and then dried over anhydrous magnesium sulfate, after which the solvent was removed by distillation to obtain 1.59 g of a resinous material.

The resinous material obtained was dissolved in tetrahydrofuran and then reprecipitated from isopropyl alcohol, and this operation was repeated to obtain 0.10 g of a purified polymer.

As a result of measuring the molecular weight distribution of the polymer obtained by GPC, it was confirmed that a higher molecular weight polysilane was obtained. The results of NMR corresponded to poly(ethyl(4-(N-(4'-(2",2"-diphenylethenyl)phenyl)-N-phenylamino)phenyl)silane).

Structure analysis data
$^1$H-NMR 0.2–1.2 ppm (5H) $\underline{C_2H_5}$—Si 6.2–7.8 ppm (24H)[$(\underline{C_6H_4})_2\underline{C}=\underline{CH}(\underline{C_6H_4})](\underline{C_6H_5})N(\underline{C_6H_4})$—Si Integral ratio aromatic/$C_2H_5$=21.0/5.0

(Tetramethylsilane 0.0 ppm standard)

Molecular weight

Mw=1.2×10$^5$, Mn=2.4×10$^4$

Mw/Mn=5.0

DP$_{50}$=70

Yield 5% (0.10 g)

EXAMPLE 13

Synthesis of ethyl(4-(N-(4'-(4"-(N',N'-diphenylamino))biphenyl)-N-phenylamino)phenyl)dichlorosilane In a three-necked 100-ml flask dried by the same operation as in Example 1 was placed 5.0 g of 4-(N-(4'-(4"-(N',N'-diphenylamino))biphenyl)-N-phenylamino) bromobenzene, and dried under vacuum. Thereto was added 50 ml of dried tetrahydrofuran distilled on metallic sodium/benzophenone just before the addition by use of a gas tight syringe to dissolve the 4-(N-(4'-(4"-(N',N'-diphenylamino))biphenyl)-N-phenylamino)bromobenzene therein, after which 6 ml of n-butyllithium (manufactured by Aldrich Company, 1.6M hexane solution) was added into the solution at −78° C. The resulting mixture was subjected to reaction for one hour at −78° C. to produce 4-(N-(4'-(4"-(N',N'-diphenylamino))biphenyl)-N-phenylamino) phenyllithium.

In a three-necked 100-ml flask dried in the same manner were placed 2.17 g of ethyltrichlorosilane (LS-120 manufactured by Shin-Etsu Chemical Co., Ltd.) distilled on calcium hydride just before the addition and 50 ml of dried tetrahydrofuran, and cooled to −78° C., after which the above-mentioned 4-(N-(4'-(4"-(N',N'-diphenylamino))biphenyl)-N-phenylamino)phenyllithium was added dropwise thereinto by use of a Teflon cannula. After the addition was complete, the resulting mixture was stirred at −78° C. for one hour and thereafter the temperature was elevated to room temperature, after which the excessive ethyltrichlorosilane and the solvent were removed by distillation. The residue was extracted with 55 ml of dried toluene and the extract obtained was filtered through a G5 glass filter under a dried argon atmosphere to remove the lithium chloride formed. The solvent was removed to obtain 5.0 g of a pale green solid. From the results of the analysis of NMR spectrum, it was confirmed that this solid is ethyl(4-(N-(4'-(4"-(N',N'-diphenylamino))biphenyl)-N-phenylamino)phenyl)dichlorosilane.

Structure analysis data
$^1$H-NMR 1.2 ppm (3H) $\underline{CH_3}CH_2$—Si 1.3 ppm (2H) $CH_3\underline{CH_2}$—Si 7.0–7.6 ppm (27H)[$(\underline{C_6H_5})_2N(\underline{C_6H_4}-\underline{C_6H_4})](\underline{C_6H_5})N(\underline{C_6H_4})$—Si (Tetramethylsilane 0.0 ppm standard)

$^{13}$C-NMR 6.34 ppm (1 line) $\underline{CH_3}CH_2$—Si 13.1 ppm (1 line) $CH_3\underline{CH_2}$—Si 121–150 ppm (19 lines)[$(\underline{C_6H_5})_2N(\underline{C_6H_4}-\underline{C_6H_4})](\underline{C_6H_5})N(\underline{C_6H_4})$—Si (Chloroform-d 77.0 ppm standard)

EXAMPLE 14

Synthesis of poly(ethyl(4-(N-(4'-(4"-(N',N'-diphenylamino))biphenyl)-N-phenylamino)phenyl)silane)

In a three-necked 50-ml flask dried by the same operation as in Example 1 was placed 0.37 g of metallic sodium cut under a dried nitrogen stream in a glove-box and then 25 ml of dried toluene was added thereto. This flask was set in an ultrasonic disperser under a dried argon stream, and the metallic sodium was irradiated with an ultrasonic wave while heated at 98°–105° C. to disperse the metallic sodium. After the dispersion was formed, the flask was allowed to stand, and then 15 ml of the excessive toluene of the supernatant liquid was removed by use of a syringe, after which 1.5 ml of diethylene glycol dimethyl ether was added to the residue obtained to form a metallic sodium suspension.

A three-necked 300-ml flask dried in the same manner were equipped with a magnetic stirrer, a thermocouple and a rubber septum and therein were placed 4.8 g of the ethyl(4-(N-(4'-(4"-(N',N'-diphenylamino))biphenyl)-N-phenylamino)phenyl)dichlorosilane synthesized in Example 13 and 10 ml of dried toluene to prepare a solution. The temperature of this flask was elevated to 95° C., and thereafter, the above-mentioned metallic sodium suspension was added dropwise into the flask over 10 minutes by use of a Teflon cannula. During the addition, the internal temperature of the flask rose to 115° C. by the heat of reaction. After completion of the addition, the resulting mixture was subjected to reaction at 105° C. for 30 minutes.

After completion of the reaction, 3 ml of isopropyl alcohol was added to the flask under an argon atmosphere to deactivate the excessive metallic sodium. The resulting precipitate was separated by a centrifuge and then washed twice with toluene to recover solubles in the form of a toluene solution. The toluene solution was washed with water and then dried over anhydrous magnesium sulfate, after which the solvent was removed by distillation to obtain 4.4 g of a resinous material. The resinous material thus obtained was dissolved in tetrahydrofuran and reprecipitated from isopropyl alcohol, and this operation was repeated to obtain 0.16 g of a purified polymer.

The results of NMR corresponded to poly(ethyl(4-(N-(4'-(4"-(N',N'-diphenylamino))biphenyl)-N-phenylamino)phenyl)silane).

Structure analysis date
$^1$H-NMR
0.0–1.4 ppm (5H) $\underline{C_2H_5}$—Si
6.4–7.6 ppm (27H)[($\underline{C_6H_5}$)$_2$N($\underline{C_6H_4}$—$\underline{C_6H_4}$)]($\underline{C_6H_5}$)N($\underline{C_6H_4}$)—Si
Integral ratio aromatic/C$_2$H$_5$=25.5/5.0
(Tetramethylsilane 0.0 ppm standard)
Elementary analysis (% by weight)

|  | Si | C | H | N |
|---|---|---|---|---|
| Found value | 5.6 | 82.6 | 6.1 | 5.0 |
| Expected value | 5.2 | 83.8 | 5.9 | 5.1 |

Molecular weight
Mw=5.9×10$^4$, Mn=7.4×10$^3$
Mw/Mn=8.0
DP$_{50}$=42
Yield 4% (0.16 g)

EXAMPLE 15
Synthesis of ethyl(4-phenoxyphenyl)dichlorosilane

A three-necked 100-ml flask dried by the same operation as in Example 1 was equipped with a magnetic stirrer, a dropping funnel and a rubber septum, and in the flask were placed 1.6 g of magnesium and 25 ml of dried tetrahydrofuran distilled on metallic sodium/benzophenone just before the addition. To this flask a solution of 15.1 g of 4-phenoxybromobenzene in 35 ml of tetrahydrofuran was added by use of the dropping funnel over 1.5 hours. After completion of the addition, the temperature was elevated to 45° C. and subjected to reaction for 0.5 hour to produce 4-phenoxyphenylmagnesium bromide.

In a two-necked 100-ml flask dried in the same manner were placed 10.9 g of ethyltrichlorosilane (LS-120 manufactured by Shin-Etsu Chemical Co., Ltd.) distilled on calcium hydride just before the addition and 80 ml of dried tetrahydrofuran, and thereafter, the above-mentioned 4-phenoxyphenylmagnesium bromide was added dropwise into the flask at room temperature by use of a Teflon cannula. After the addition was complete, the resulting mixture was subjected to reaction overnight at room temperature, and thereafter, the resulting white precipitate was filtered through the Schlenk filter. The excessive ethyltrichlorosilane and the solvent were removed by distillation and the residue obtained was subjected to distillation under reduced pressure (145° C./0.2 mm Hg) to obtain 6.8 g (yield: 38%) of a colorless, transparent, viscous liquid. From the results of NMR, it was confirmed that this liquid was ethyl(4-phenoxyphenyl)dichlorosilane.

Structure analysis data
$^1$H-NMR
1.14 ppm (3H) $\underline{CH_3}$CH$_2$—Si
1.3 ppm (2H) CH$_3$$\underline{CH_2}$—Si
7.7 ppm (9H)($\underline{C_6H_5}$)O($\underline{C_6H_4}$)—Si
(Tetramethylsilane 0.0 ppm standard)
$^{13}$C-NMR
6.3 ppm $\underline{CH_3}$CH$_2$—Si
13.2 ppm CH$_3$$\underline{CH_2}$—Si
118–161 ppm (8 lines) ($\underline{C_6H_5}$)O($\underline{C_6H_4}$)—Si
(Chloroform-d 77.1 ppm standard)

EXAMPLE 16
Synthesis of poly(ethyl(4-phenoxyphenyl)silane)

In a three-necked 50-ml flask dried by the same operation as in Example 1 was placed 1.0 g of metallic sodium cut under a dried nitrogen atmosphere in a glove-box and 30 ml of dried toluene, and this flask was set in an ultrasonic disperser, after which the metallic sodium was dispersed at 100°–105° C. After the dispersion was formed, the flask was allowed to stand and 25 ml of the excessive toluene of the supernatant liquid was then removed by a syringe to form a metallic sodium suspension.

A three-necked 50-ml flask dried in the same manner was equipped with a magnetic stirrer, a thermocouple and a rubber septum, and therein were placed 5.83 g of the ethyl(4-phenoxyphenyl)dichlorosilane synthesized in Example 15 and distilled just before the addition and 15 ml of dried toluene to prepare a solution. The temperature of this flask was elevated to 85° C. and thereafter the above metallic sodium suspension was added dropwise into the flask by use of a Teflon cannula over about 10 minutes. After completion of the addition, the contents of the flask were subjected to reaction for 40 minutes, and the temperature was further elevated to 105° C., at which the contents were subjected to reaction for five hours, after which toluene and isopropyl alcohol were added to terminate the reaction and simultaneously deactivate the excessive metallic sodium.

The resulting precipitate was separated by a centrifugal operation and then washed twice with toluene to recover solubles in the form of a toluene solution. The toluene solution was washed with water and then dried over anhydrous magnesium sulfate, after which the solvent was removed by distillation to obtain a resinous material. This resinous material was dissolved in tetrahydrofuran and reprecipitated from isopropyl alcohol, and this operation was repeated to obtain 0.22 g of a purified polymer.

As a result of measuring the molecular weight distribution of the polymer obtained by GPC, it was confirmed that a higher molecular weight polysilane was obtained. The results of NMR corresponded to poly(ethyl(4-phenoxyphenyl)silane).

Structure analysis data
$^1$H-NMR

−0.3–1.4 ppm (5H) C$_2$H$_5$—Si
6.0–7.6 ppm (9H) (C$_6$H$_5$)O(C$_6$H$_4$)—Si
Integral ratio aromatic/C$_2$H$_5$=8.4/5.0
(Dioxane 3.57 ppm standard)
Elementary analysis (% by weight)

|                | Si   | C    | H   | O   |
|----------------|------|------|-----|-----|
| Found value    | 12.1 | 73.6 | 6.3 | 6.9 |
| Expected value | 12.4 | 74.3 | 6.2 | 7.1 |

Molecular weight
Mw=2.4×10$^6$, Mn=1.3×10$^4$
Mw/Mn=185
DP$_{50}$=7,900
Yield 5% (0.22 g)

The polysilane of this invention is a very useful polymer in industry as a hole transporting material of a layered photosensitive image-forming member such as electrophotographic photoreceptor, electrophotographic printing plate or the like; a hole transporting material for an organic electroluminescent device, a photoconductive material for spatial light modulator or a material for organic electronic device and organic photonic device such as electric field effect transistor, solar cell or the like; and further as an organic conductive material when doped with iodine or the like.

What is claimed is:

1. A polysilane having a hole drift mobility of 3×10$^{-4}$ to 1×10$^{-1}$ cm$^2$/V/sec whose main chain skeleton contains repeating units represented by the general formula (1):

wherein
R$_1$ represents a straight chain or branched alkyl group having 1 to 10 carbon atoms, a cyclo-alkyl group having not more than 10 carbon atoms, an aryl group having 6 to 24 carbon atoms or an aralkyl group having 7 to 26 carbon atoms, in which each of the groups may be substituted with at least one straight chain or branched alkyl group having 1 to 6 carbon atoms or at least one cyclo-alkyl group having not more than 6 carbon atoms;

X is an atom having an unpaired electron or a group containing an atom having an unpaired electron and represents a nitrogen atom-containing group represented by the general formula (2):

wherein R$_2$ represents a straight chain or branched alkyl group having 1 to 10 carbon atoms, a cyclo-alkyl group having not more than 10 carbon atoms, an aryl group having 6 to 24 carbon atoms or an aralkyl group having 7 to 26 carbon atoms, in which each of the groups may be substituted with at least one straight chain or branched alkyl group having 1 to 6 carbon atoms or at least one cyclo-alkyl group having not more than 6 carbon atoms;

Ar$_1$ represents an arylene group having 6 to 24 carbon atoms, which may be substituted with straight chain or branched alkyl groups having 1 to 6 carbon atoms or cycloalkyl groups having not more than 6 carbon atoms;

Ar$_2$ represents an aryl group having 6 to 24 carbon atoms, which may be substituted with at least one straight chain or branched alkyl group having 1 to 6 carbon atoms or at least one cyclo-alkyl group having not more than 6 carbon atoms, a group having an aromatic amine skeleton represented by the general formula (3):

wherein Ar$_3$ represents an arylene group having 6 to 24 carbon atoms, which may be substituted with at least one straight chain or branched alkyl group having 1 to 6 carbon atoms or at least one cyclo-alkyl group having not more than 6 carbon atoms, each of R$_3$ and R$_4$ represents independently a straight chain or branched alkyl group having 1 to 10 carbon atoms, a cyclo-alkyl group having not more than 10 carbon atoms, an aryl group having 6 to 24 carbon atoms or an aralkyl group having 7 to 26 carbon atoms, in which each of the groups may be substituted with at least one straight chain or branched alkyl group having 1 to 6 carbon atoms or at least one cyclo-alkyl group having not more than 6 carbon atoms, or a group having an aromatic ethenylene skeleton represented by the general formula (4):

wherein Ar$_4$ represents an arylene group having 6 to 24 carbon atoms, which may be substituted with at least one straight chain or branched alkyl group having 1 to 6 carbon atoms or at least one cyclo-alkyl group having not more than 6 carbon atoms, each of R$_5$ and R$_6$ represents independently a hydrogen atom or a straight chain or branched alkyl group having 1 to 10 carbon atoms, a cyclo-alkyl group having not more than 10 carbon atoms, an aryl group having 6 to 24 carbon atoms or an aralkyl group having 7 to 26 carbon atoms, in which each of the groups may be substituted with at least one straight chain or branched alkyl group having 1 to 6 carbon atoms or at least one cyclo-alkyl group having not more than 6 carbon atoms, Ar$_5$ represents an aryl group having 6 to 24 carbon atoms, which may be substituted with at least one straight chain or branched alkyl group having 1 to 6 carbon atoms or at least one cyclo-alkyl groups having not more than 6 carbon atoms; and Ar$_1$ and Ar$_2$ may be bonded to each other to form a ring together with X to which they are bonded or when X represents a group represented by the general formula (2), Ar$_1$ and R$_2$ or R$_2$ and Ar$_2$ may be bonded to each other to form a ring together with the N atom to which they are bonded, and a repeating unit represented by the general formula (5):

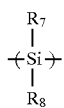
(5)

wherein each of $R_7$ and $R_8$ represents independently a straight chain or branched alkyl group having 1 to 10 carbon atoms, a cyclo-alkyl group having not more than 10 carbon atoms, an aryl group having 6 to 24 carbon atoms or an aralkyl group having 7 to 26 carbon atoms, in which each of the groups may be substituted with at least one straight chain or branched alkyl groups having 1 to 6 carbon atoms or at least one cyclo-alkyl group having not more than 6 carbon atoms, wherein when the ratio of the number of the repeating units (1) to and the ratio of the number of the repeating units (5) to the total number of the repeating units (1) and the repeating units (5) are indicated as z and 1–z, respectively, and z satisfies $0.2 \leq z \leq 1$.

2. The polysilane according to claim 1, wherein in the general formula (1), X is a group represented by the general formula (2) in which $R_2$ represents a phenyl group which may be substituted with at least one straight chain or branched alkyl group having 1 to 6 carbon atoms or at least one cyclo-alkyl group having not more than 6 carbon atoms; $Ar_1$ represents a phenylene group which may be substituted with at least one straight chain or branched alkyl group having 1 to 6 carbon atoms or at least one cyclo-alkyl group having not more than 6 carbon atoms; $Ar_2$ represents a phenyl group which may be substituted with at least one straight chain or branched alkyl group having 1 to 6 carbon atoms or at least one cyclo-alkyl group having not more than 6 carbon atoms.

3. The polysilane according to claim 1, wherein the side chain group $Ar_2$—X—$Ar_1$— in the general formula (1) is such a group that a molecule represented by the general formula (6) corresponding to said side chain group:

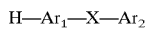 (6)

wherein H means a hydrogen atom, and $Ar_1$, X and $Ar_2$ are as defined in the general formula (1), has an ionization potential of not more than 6.0 eV.

4. The polysilane according to claim 1, wherein in the general formula (1), X is a group represented by the general formula (2) in which $R_2$ represents a substituted or unsubstituted phenyl group; $Ar_1$ represents a substituted or unsubstituted phenylene group; and $Ar_2$ is a group having an aromatic amine skeleton represented by the general formula (3) in which $Ar_3$ represents a substituted or unsubstituted phenylene or biphenylene group and each of $R_3$ and $R_4$ represents independently a substituted or unsubstituted phenyl group.

5. The polysilane according to claim 1, wherein in the general formula (1), X is a group represented by the general formula (2) in which $R_2$ represents a substituted or unsubstituted phenyl group; $Ar_1$ represents a substituted or unsubstituted phenylene group; and $Ar_2$ is a group having an aromatic ethenylene skeleton represented by the general formula (4) in which $Ar_4$ represents a substituted or unsubstituted phenylene group and each of $R_6$ and $Ar_5$ represents independently a substituted or unsubstituted phenyl group.

6. The polysilane according to claim 1, wherein when the average number of repeating units per molecule is defined as k satisfying the following equation (1):

$$\frac{\sum_{i=1}^{k} i \cdot f_i}{\sum_{i=1}^{\infty} i \cdot f_i} \times 100 = 50(\%) \quad (1)$$

wherein i represents the number of the repeating units in one molecule, and $f_i$ represents the frequency of molecule having i repeating units, k is at least 70.

7. The polysilane according to claim 6, wherein in the general formula (1), X is a group represented by the general formula (2); the k satisfying the equation (1) is at least 70; and the polysilane has a hole drift mobility of $1 \times 10^{-3}$ to $1 \times 10^{-1}$ cm$^2$/V/sec.

8. A process for producing a polysilane which comprises:

polycondensing (i) a dihalosilane or (ii) a dihalosilane mixture using an alkali metal in an inert solvent to obtain a polysilane having a hole drift mobility of $3 \times 10^{-4}$ to $1 \times 10^{-1}$ cm$^2$/V/sec, wherein said dihalosilane (i) is represented by the general formula (7)

wherein Y represents a chlorine atom, a bromine atom or an iodine atom; $R_1$ represents a straight chain or branched alkyl group having 1 to 10 carbon atoms, a cyclo-alkyl group having up to 10 carbon atoms, an aryl group having 6 to 24 carbon atoms, or an aralkyl group having 7 to 26 carbon atoms, wherein $R_1$ is optionally substituted with at least one straight chain or branched alkyl group having 1 to 6 carbon atoms, or at least one cyclo-alkyl group having up to 6 carbon atoms; X is an atom having an unpaired electron or a group containing an atom having an unpaired electron, and represents a nitrogen containing group represented by the general formula (2)

wherein $R_2$ represents a straight chain or branched alkyl group having 1 to 10 carbon atoms, a cyclo-alkyl group having up to 10 carbon atoms, an aryl group having 6 to 24 carbon atoms or an aralkyl group having 7 to 26 carbon atoms, in which each of the groups may be substituted with at least one straight chain or branched alkyl group having 1 to 6 carbon atoms or at least one cyclo-alkyl group having not more than 6 carbon atoms, $Ar_1$ represents an arylene group having 6 to 24 carbon atoms which may be substituted with at least one straight or branched alkyl group having 1 to 6 carbon atoms or at least one cyclo-alkyl group having up to 6 carbon atoms, $Ar_2$ represents an aryl group having 6 to 24 carbon atoms, which may be substituted with at least one straight or branched alkyl group having 1 to 6 carbon atoms or at least one cyclo-alkyl group having up to 6 carbon atoms, a group having an aromatic amine skeleton represented by the general formula (3)

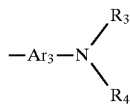  (3)

wherein $Ar_3$ represents an arylene group having 6 to 24 carbon atoms which may be substituted with at least one straight chain or branched alkyl group having 1 to 6 carbon atoms or at least one cycloalkyl group having up to 6 carbon atoms, each of $R_3$ and $R_4$ represents independently a straight chain or branched alkyl group having 1 to 10 carbon atoms, a cyclo-alkyl group having up to 10 carbon atoms, an aryl group having 6 to 24 carbon atoms, an aralkyl group having 7 to 26 carbon atoms, in which each may be substituted with at least one straight chain or branched alkyl group having 1 to 6 carbon atoms or at least one cyclo-alkyl group having up to 6 carbon atoms, or a group having an aromatic ethenylene skeleton represented by the general formula (4)

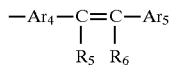  (4)

wherein $Ar_4$ represents an arylene group having 6 to 24 carbon atoms, which may be substituted with at least one straight chain or branched alkyl group having 1 to 6 carbon atoms or at least one cyclo-alkyl groups having not more than 6 carbon atoms, each of $R_5$ and $R_6$ represents independently a hydrogen atom or a straight chain or branched alkyl group having 1 to 10 carbon atoms, a cyclo-alkyl group having not more than 10 carbon atoms, an aryl group having 6 to 24 carbon atoms or an aralkyl group having 7 to 26 carbon atoms, in which each of the groups may be substituted with at least one straight chain or branched alkyl group having 1 to 6 carbon atoms or at least one cyclo-alkyl group having not more than 6 carbon atoms, $Ar_5$ represents an aryl group having 6 to 24 carbon atoms which may be substituted with at least one straight chain or branched alkyl group having 1 to 6 carbon atoms or at least one cyclo-alkyl group having not more than 6 carbon atoms; and $Ar_1$ and $Ar_2$ may be bonded to each other to form a ring together with X to which they are bonded or when X is a nitrogen atom-containing group represented by the general formula (2), $Ar_1$ and $R_2$ or $R_2$ and $Ar_2$ may be bonded to each other to form a ring together with the N atom to which they are bonded;

and said dihalosilane mixture (ii) contains a dihalosilane represented by the general formula (7) and a dihalosilane represented by said general formula (8):

  (8)

wherein

Y represents a chlorine atom, a bromine atom or an iodine atom;

$R_7$ and $R_8$ are independently a straight chain or branched alkyl group having 1 to 10 carbon atoms, a cyclo-alkyl group having not more than 10 carbon atoms, an aryl group having 6 to 24 carbon atoms or an aralkyl group having 7 to 26 carbon atoms, in which each of the groups may be substituted with at least one straight chain or branched alkyl group having 1 to 6 carbon atoms or at least one cyclo-alkyl group having not more than 6 carbon atoms.

9. The process for producing a polysilane according to claim 8, wherein the dihalosilane or the dihalosilane mixture is subjected to polycondensation by adding an alkali metal suspension into a solution of the dihalosilane or the dihalosilane mixture in the inert solvent.

10. The process for producing a polysilane according to claim 8 or 9, wherein the polycondensation reaction is carried out at a temperature from room temperature to the lower temperature of the boiling point of a solvent and 100° C. and the alkali metal is used in the form of fine particles.

11. The process according to claim 8, wherein a dihalosilane represented by the general formula (7) is polycondensed.

12. The process according to claim 8, wherein a dihalosilane mixture of a dihalosilane represented by two general formula (7) and a dihalosilane represented by the general formula (8) are polycondensed.

* * * * *